(12) United States Patent
Karaoguz et al.

(10) Patent No.: US 9,462,345 B2
(45) Date of Patent: Oct. 4, 2016

(54) SYSTEM AND METHOD IN A TELEVISION SYSTEM FOR PROVIDING FOR USER-SELECTION OF AN OBJECT IN A TELEVISION PROGRAM

(75) Inventors: Jeyhan Karaoguz, Irvine, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1325 days.

(21) Appl. No.: 12/851,036

(22) Filed: Aug. 5, 2010

(65) Prior Publication Data
US 2011/0067061 A1 Mar. 17, 2011

Related U.S. Application Data

(60) Provisional application No. 61/242,234, filed on Sep. 14, 2009.

(51) Int. Cl.
*H04N 7/173* (2011.01)
*H04N 21/482* (2011.01)
(Continued)

(52) U.S. Cl.
CPC .......... *H04N 21/482* (2013.01); *G06F 3/0304* (2013.01); *G06F 3/0308* (2013.01); *G06F 3/0325* (2013.01); *G06F 3/0346* (2013.01); *G06F 3/0386* (2013.01); *G06F 3/0412* (2013.01); *G06F 3/0428* (2013.01); *H04N 5/445* (2013.01); *H04N 5/76* (2013.01); *H04N 9/8205* (2013.01); *H04N 21/23892* (2013.01); *H04N 21/234318* (2013.01); *H04N 21/2408* (2013.01); *H04N 21/25841* (2013.01); *H04N 21/2668* (2013.01); *H04N 21/42204* (2013.01); *H04N 21/42207* (2013.01); *H04N 21/42209* (2013.01); *H04N 21/436* (2013.01); *H04N 21/438* (2013.01); *H04N 21/4325* (2013.01);
(Continued)

(58) Field of Classification Search
CPC ................... H04N 21/482; H04N 21/234318; H04N 21/23892; H04N 21/2408; H04N 21/2581; H04N 21/2668; H04N 21/438; H04N 21/812; H04N 21/8126
USPC ............. 725/110, 112, 39–61, 133, 141, 153
See application file for complete search history.

(56) References Cited

U.S. PATENT DOCUMENTS

| | | |
|---|---|---|
| 5,111,511 A | 5/1992 | Ishii et al. |
| 5,408,258 A | 4/1995 | Kolessar |

(Continued)

FOREIGN PATENT DOCUMENTS

| | | |
|---|---|---|
| CN | 1193869 A | 9/1998 |
| CN | 1300501 A | 6/2001 |

(Continued)

OTHER PUBLICATIONS

Office Action from related U.S. Appl. No. 12/881,004 dated Nov. 1, 2012.

(Continued)

*Primary Examiner* — Farzana Hossain
(74) *Attorney, Agent, or Firm* — Brinks Gilson & Lione

(57) ABSTRACT

A system and method in a television system for providing for user-selection of objects in a television program, substantially as shown in and/or described in connection with at least one of the figures, as set forth more completely in the claims.

2 Claims, 5 Drawing Sheets

(51) Int. Cl.
| | |
|---|---|
| *H04N 21/4722* | (2011.01) |
| *H04N 21/462* | (2011.01) |
| *G06F 3/03* | (2006.01) |
| *G06F 3/0346* | (2013.01) |
| *G06F 3/042* | (2006.01) |
| *H04N 5/76* | (2006.01) |
| *H04N 9/82* | (2006.01) |
| *H04N 21/2343* | (2011.01) |
| *H04N 21/2389* | (2011.01) |
| *H04N 21/422* | (2011.01) |
| *H04N 21/432* | (2011.01) |
| *H04N 21/433* | (2011.01) |
| *H04N 21/4725* | (2011.01) |
| *H04N 21/4728* | (2011.01) |
| *H04N 21/845* | (2011.01) |
| *G06F 3/038* | (2013.01) |
| *H04N 5/445* | (2011.01) |
| *H04N 21/436* | (2011.01) |
| *H04N 21/258* | (2011.01) |
| *H04N 21/45* | (2011.01) |
| *H04N 21/2668* | (2011.01) |
| *H04N 21/472* | (2011.01) |
| *H04N 21/8545* | (2011.01) |
| *H04N 21/858* | (2011.01) |
| *H04N 21/24* | (2011.01) |
| *H04N 21/438* | (2011.01) |
| *H04N 21/81* | (2011.01) |
| *G06F 3/041* | (2006.01) |
| *H04N 21/478* | (2011.01) |
| *H04N 21/44* | (2011.01) |
| *H04N 21/4782* | (2011.01) |
| *H04N 5/44* | (2011.01) |

(52) U.S. Cl.
CPC .... *H04N21/4334* (2013.01); *H04N 21/44008* (2013.01); *H04N 21/4524* (2013.01); *H04N 21/4622* (2013.01); *H04N 21/472* (2013.01); *H04N 21/4722* (2013.01); *H04N 21/4725* (2013.01); *H04N 21/4728* (2013.01); *H04N 21/4782* (2013.01); *H04N 21/47805* (2013.01); *H04N 21/47815* (2013.01); *H04N 21/4826* (2013.01); *H04N 21/4828* (2013.01); *H04N 21/812* (2013.01); *H04N 21/8126* (2013.01); *H04N 21/8133* (2013.01); *H04N 21/8173* (2013.01); *H04N 21/845* (2013.01); *H04N 21/858* (2013.01); *H04N 21/8545* (2013.01); *H04N 2005/4428* (2013.01); *H04N 2005/4432* (2013.01)

(56) References Cited

U.S. PATENT DOCUMENTS

| | | | |
|---|---|---|---|
| 5,543,851 A * | 8/1996 | Chang | 348/468 |
| 5,602,568 A | 2/1997 | Kim | |
| 5,708,845 A | 1/1998 | Wistendahl | |
| 5,718,845 A | 2/1998 | Drost | |
| 5,721,584 A | 2/1998 | Yoshinobu et al. | |
| 5,727,141 A | 3/1998 | Hoddie | |
| 5,793,361 A | 8/1998 | Kahn et al. | |
| 5,929,849 A | 7/1999 | Kikinis | |
| 6,097,441 A * | 8/2000 | Allport | 348/552 |
| 6,122,660 A | 9/2000 | Baransky et al. | |
| 6,133,911 A | 10/2000 | Kim | |
| 6,255,961 B1 | 7/2001 | Van Ryzin et al. | |
| 6,256,785 B1 | 7/2001 | Klappert et al. | |
| 6,282,713 B1 | 8/2001 | Kitsukawa et al. | |
| 6,314,569 B1 | 11/2001 | Chernock et al. | |
| 6,317,714 B1 | 11/2001 | Del Castillo et al. | |
| 6,349,410 B1 * | 2/2002 | Lortz | 725/110 |
| 6,532,592 B1 | 3/2003 | Shintani et al. | |
| 6,538,672 B1 | 3/2003 | Dobbelaar | |
| 6,567,984 B1 | 5/2003 | Allport | |
| 6,931,660 B1 | 8/2005 | Kalluri et al. | |
| 7,053,965 B1 | 5/2006 | Fan | |
| 7,057,670 B2 | 6/2006 | Kikinis | |
| 7,102,616 B1 | 9/2006 | Sleator | |
| 7,158,676 B1 | 1/2007 | Rainsfords | |
| 7,207,053 B1 | 4/2007 | Asmussen | |
| 7,301,530 B2 | 11/2007 | Lee et al. | |
| 7,344,084 B2 | 3/2008 | Dacosta | |
| 7,360,232 B2 | 4/2008 | Mitchell | |
| 7,409,437 B2 | 8/2008 | Ullman et al. | |
| 7,535,456 B2 | 5/2009 | Liberty | |
| 7,536,706 B1 | 5/2009 | Sezan | |
| 7,612,748 B2 | 11/2009 | Tateuchi | |
| 7,631,338 B2 | 12/2009 | Del Sesto et al. | |
| 7,805,747 B2 | 9/2010 | Klappert | |
| 7,827,577 B2 | 11/2010 | Pack | |
| 7,864,159 B2 | 1/2011 | Sweetser et al. | |
| 7,889,175 B2 | 2/2011 | Kryze et al. | |
| 7,890,380 B2 | 2/2011 | Stefanik | |
| 7,987,478 B2 | 7/2011 | Minor | |
| 8,068,781 B2 | 11/2011 | Ilan et al. | |
| 8,095,423 B2 | 1/2012 | Nichols | |
| 8,181,212 B2 | 5/2012 | Sigal | |
| 8,223,136 B2 | 7/2012 | Hu et al. | |
| 8,269,746 B2 | 9/2012 | Hodges et al. | |
| 8,290,513 B2 | 10/2012 | Forstall et al. | |
| 8,359,628 B2 | 1/2013 | Kitaru et al. | |
| 8,421,746 B2 | 4/2013 | Igoe | |
| 8,436,809 B2 | 5/2013 | Sohn et al. | |
| 8,451,223 B2 | 5/2013 | Choi et al. | |
| 8,608,535 B2 | 12/2013 | Weston | |
| 8,760,401 B2 | 6/2014 | Kimmel et al. | |
| 2001/0019368 A1 | 9/2001 | Holme et al. | |
| 2001/0023436 A1 | 9/2001 | Srinivasan | |
| 2001/0047298 A1 | 11/2001 | Moore | |
| 2002/0016965 A1 | 2/2002 | Tomsen | |
| 2002/0040482 A1 | 4/2002 | Sextro | |
| 2002/0042925 A1 | 4/2002 | Ebisu | |
| 2002/0056136 A1 * | 5/2002 | Wistendahl et al. | 725/135 |
| 2002/0069405 A1 | 6/2002 | Chapin et al. | |
| 2002/0078446 A1 | 6/2002 | Dakss | |
| 2002/0090114 A1 | 7/2002 | Rhoads | |
| 2002/0120934 A1 | 8/2002 | Abrahams | |
| 2002/0136432 A1 | 9/2002 | Koike et al. | |
| 2002/0162120 A1 | 10/2002 | Mitchell | |
| 2003/0005445 A1 | 1/2003 | Schein | |
| 2003/0023981 A1 | 1/2003 | Lemmons | |
| 2003/0028873 A1 | 2/2003 | Lemmons | |
| 2003/0035075 A1 | 2/2003 | Butler et al. | |
| 2003/0051253 A1 | 3/2003 | Barone | |
| 2003/0054878 A1 | 3/2003 | Benoy et al. | |
| 2003/0079224 A1 | 4/2003 | Komar et al. | |
| 2003/0115602 A1 | 6/2003 | Knee | |
| 2003/0145326 A1 | 7/2003 | Gutta et al. | |
| 2003/0212996 A1 | 11/2003 | Wolzien | |
| 2003/0217360 A1 | 11/2003 | Gordon et al. | |
| 2003/0236752 A1 | 12/2003 | Dawson et al. | |
| 2004/0003412 A1 | 1/2004 | Halbert | |
| 2004/0078814 A1 | 4/2004 | Allen | |
| 2004/0109087 A1 | 6/2004 | Robinson et al. | |
| 2004/0119701 A1 | 6/2004 | Mulligan et al. | |
| 2004/0167855 A1 | 8/2004 | Cambridge | |
| 2004/0221025 A1 | 11/2004 | Johnson et al. | |
| 2004/0236865 A1 | 11/2004 | Ullman | |
| 2004/0268401 A1 | 12/2004 | Gray et al. | |
| 2005/0028208 A1 | 2/2005 | Ellis | |
| 2005/0086690 A1 | 4/2005 | Gilfix et al. | |
| 2005/0132420 A1 | 6/2005 | Howard et al. | |
| 2005/0137958 A1 | 6/2005 | Huber et al. | |
| 2005/0138668 A1 | 6/2005 | Gray et al. | |
| 2005/0153687 A1 | 7/2005 | Niemenmaa et al. | |
| 2005/0166257 A1 | 7/2005 | Feinleib et al. | |
| 2005/0177861 A1 | 8/2005 | Ma et al. | |
| 2005/0193425 A1 | 9/2005 | Sull | |
| 2005/0229227 A1 | 10/2005 | Rogers | |

(56) References Cited

U.S. PATENT DOCUMENTS

| | | |
|---|---|---|
| 2005/0234782 A1 | 10/2005 | Schackne et al. |
| 2005/0251835 A1* | 11/2005 | Scott et al. ............ 725/88 |
| 2006/0037044 A1* | 2/2006 | Daniels ............... 725/39 |
| 2006/0174273 A1 | 8/2006 | Park |
| 2006/0195878 A1 | 8/2006 | Pack et al. |
| 2006/0259930 A1 | 11/2006 | Rothschild |
| 2006/0268895 A1 | 11/2006 | Kotzin |
| 2006/0282847 A1 | 12/2006 | Gupte |
| 2007/0130581 A1 | 6/2007 | Del Sesto et al. |
| 2007/0156521 A1 | 7/2007 | Yates |
| 2007/0157260 A1 | 7/2007 | Walker |
| 2007/0195205 A1 | 8/2007 | Lowe |
| 2007/0199014 A1 | 8/2007 | Clark et al. |
| 2007/0250901 A1 | 10/2007 | McIntire et al. |
| 2007/0261079 A1 | 11/2007 | Pack et al. |
| 2007/0266406 A1 | 11/2007 | Aravamudan |
| 2007/0277201 A1 | 11/2007 | Wong |
| 2007/0300263 A1* | 12/2007 | Barton et al. ............ 725/60 |
| 2008/0016526 A1 | 1/2008 | Asmussen |
| 2008/0052750 A1 | 2/2008 | Grunnet-Jepsen |
| 2008/0066097 A1 | 3/2008 | Park et al. |
| 2008/0066129 A1 | 3/2008 | Katcher et al. |
| 2008/0071750 A1 | 3/2008 | Schloter |
| 2008/0089551 A1 | 4/2008 | Heather et al. |
| 2008/0109851 A1 | 5/2008 | Heather |
| 2008/0132163 A1 | 6/2008 | Ilan et al. |
| 2008/0134342 A1 | 6/2008 | Shamoon et al. |
| 2008/0136754 A1 | 6/2008 | Tsuzaki et al. |
| 2008/0172693 A1 | 7/2008 | Ludvig |
| 2008/0177570 A1 | 7/2008 | Craine |
| 2008/0184132 A1 | 7/2008 | Zato |
| 2008/0204603 A1 | 8/2008 | Hattori |
| 2008/0204605 A1 | 8/2008 | Tsai |
| 2008/0209480 A1 | 8/2008 | Eide |
| 2009/0006211 A1 | 1/2009 | Perry et al. |
| 2009/0021473 A1 | 1/2009 | Grant et al. |
| 2009/0034784 A1 | 2/2009 | McQuaide, Jr. |
| 2009/0037947 A1 | 2/2009 | Patil |
| 2009/0077394 A1 | 3/2009 | Tsai et al. |
| 2009/0083815 A1* | 3/2009 | McMaster et al. ......... 725/110 |
| 2009/0113475 A1 | 4/2009 | Li |
| 2009/0165041 A1 | 6/2009 | Penberthy et al. |
| 2009/0165048 A1 | 6/2009 | Nishimura |
| 2009/0187862 A1 | 7/2009 | DaCosta |
| 2009/0199259 A1 | 8/2009 | Alao et al. |
| 2009/0217317 A1 | 8/2009 | White |
| 2009/0235312 A1 | 9/2009 | Morad |
| 2009/0237572 A1 | 9/2009 | Kishimoto |
| 2009/0256811 A1 | 10/2009 | Pasquariello |
| 2009/0271815 A1 | 10/2009 | Contin et al. |
| 2009/0296686 A1 | 12/2009 | Pirani et al. |
| 2009/0327894 A1 | 12/2009 | Rakib et al. |
| 2010/0005488 A1 | 1/2010 | Rakib et al. |
| 2010/0064320 A1 | 3/2010 | Angiolillo et al. |
| 2010/0097348 A1 | 4/2010 | Park et al. |
| 2010/0098074 A1 | 4/2010 | Kokemak |
| 2010/0157152 A1 | 6/2010 | Weitbruch et al. |
| 2010/0162303 A1 | 6/2010 | Cassanova |
| 2010/0218228 A1 | 8/2010 | Walter |
| 2010/0257448 A1 | 10/2010 | Squires |
| 2011/0032191 A1 | 2/2011 | Cooke et al. |
| 2011/0063523 A1 | 3/2011 | Karaoguz et al. |
| 2011/0066929 A1 | 3/2011 | Karaoguz et al. |
| 2011/0067062 A1 | 3/2011 | Karaoguz et al. |
| 2011/0067063 A1* | 3/2011 | Karaoguz et al. ......... 725/40 |
| 2011/0067064 A1* | 3/2011 | Karaoguz et al. ......... 725/40 |
| 2011/0067069 A1* | 3/2011 | Karaoguz et al. ......... 725/54 |
| 2011/0141013 A1 | 6/2011 | Matthews |
| 2011/0179435 A1 | 7/2011 | Cordray |
| 2012/0079525 A1 | 3/2012 | Ellis |
| 2012/0154268 A1 | 6/2012 | Alten |
| 2012/0163776 A1 | 6/2012 | Hassell et al. |
| 2014/0101690 A1 | 4/2014 | Boncyk et al. |

FOREIGN PATENT DOCUMENTS

| | | |
|---|---|---|
| CN | 1329796 A | 1/2002 |
| WO | WO 99/04559 A1 | 1/1999 |
| WO | 2007/137611 | 12/2007 |
| WO | WO 2007/137611 | 12/2007 |
| WO | WO2007/137611 A1 | 12/2007 |
| WO | WO2009/033500 A1 | 3/2009 |

OTHER PUBLICATIONS

Final Office Action from related U.S. Appl. No. 12/881,067 dated Oct. 9, 2012.
Office Action from related U.S. Appl. No. 12/851,075 dated Sep. 5, 2012.
Office Action from related U.S. Appl. No. 12/774,221 dated Aug. 29, 2012.
Final Office Action from related U.S. Appl. No. 12/881,110 dated Oct. 17, 2012.
Office Action from related U.S. Appl. No. 12/850,866 dated Oct. 4, 2012.
Final Office Action from related U.S. Appl. No. 12/850,911 dated Oct. 5, 2012.
Final Office Action from related U.S. Appl. No. 12/880,851 dated Nov. 14, 2012.
Office Action from related U.S. Appl. No. 12/774,321 dated Nov. 14, 2012.
Office Action from related U.S. Appl. No. 12/880,530 dated Aug. 2, 2012.
Office Action from related U.S. Appl. No. 12/880,594 dated Jun. 19, 2012.
Office Action from related U.S. Appl. No. 12/880,668 dated Jul. 2, 2012.
Office Action from related U.S. Appl. No. 12/881,067 dated Jun. 27, 2012.
Office Action from related U.S. Appl. No. 12/881,096 dated Jun. 19, 2012.
Office Action from related U.S. Appl. No. 12/880,749 dated Aug. 30, 2012.
Office Action from related U.S. Appl. No. 12/880,851 dated Jun. 20, 2012.
Office Action from related U.S. Appl. No. 12/880,888 dated Jul. 2, 2012.
Office Action from related U.S. Appl. No. 12/881,110 dated May 29, 2012.
Office Action from related U.S. Appl. No. 12/774,380 dated Jul. 9, 2012.
Office Action from related U.S. Appl. No. 12/850,832 dated Aug. 15, 2012.
Office Action from related U.S. Appl. No. 12/850,866 dated Jun. 20, 2012.
Office Action from related U.S. Appl. No. 12/850,911 dated Jun. 20, 2012.
Office Action from related U.S. Appl. No. 12/850,945 dated Aug. 2, 2012.
Office Action from related U.S. Appl. No. 12/880,965 dated Jun. 25, 2012.
Office Action from related U.S. Appl. No. 12/774,154 dated Dec. 5, 2012.
Final Office Action from related U.S. Appl. No. 12/880,530 dated Jan. 14, 2013.
Final Office Action from related U.S. Appl. No. 12/880,594 dated Nov. 28, 2012.
Office Action from related U.S. Appl. No. 12/880,668 dated Jan. 2, 2013.
Final Office Action from related U.S. Appl. No. 12/881,096 dated Jan. 23, 2013.
Final Office Action from related U.S. Appl. No. 12/880,749 dated Feb. 1, 2013.
Final Office Action from related U.S. Appl. No. 12/880,888 dated Dec. 6, 2012.
Office Action from related U.S. Appl. No. 12/774,380 dated Jan. 8, 2013.

(56) References Cited

OTHER PUBLICATIONS

Final Office Action from related U.S. Appl. No. 12/880,965 dated Jan. 11, 2013.
Non-Final Office Action from related U.S. Appl. No. 12/774,221 dated Feb. 26, 2013.
Final Office Action from related U.S. Appl. No. 12/850,945 dated Apr. 26, 2013.
Final Office Action from related U.S. Appl. No. 12/774,321 dated Jun. 27, 2013.
Non-Final Office Action from related U.S. Appl. No. 12/774,154 dated Aug. 14, 2013.
Non-Final Office Action from related U.S. Appl. No. 12/850,945 dated Aug. 27, 2013.
Non-Final Office Action from related U.S. Appl. No. 12/880,668 dated Jun. 10, 2013.
Final Office Action from related U.S. Appl. No. 12/880,851 dated Sep. 10, 2013.
Non-Final Office Action from related U.S. Appl. No. 12/881,031 dated Sep. 10, 2013.
Non-Final Office Action from related U.S. Appl. No. 12/774,221 dated Sep. 20, 2013.
Non-Final Office Action from related U.S. Appl. No. 12/881,004 dated Oct. 30, 2013.
Non-Final Office Action from related U.S. Appl. No. 12/880,594 dated Oct. 22, 2013.
Final Office Action from related U.S. Appl. No. 12/880,668 dated Nov. 26, 2013.
Non-Final Office Action from related U.S. Appl. No. 12/880,888 dated Nov. 4, 2013.
Non-Final Office Action from related U.S. Appl. No. 12/774,321 dated Feb. 7, 2014.
Non-Final Office Action from related U.S. Appl. No. 12/850,832 dated Mar. 24, 2014.
Non-Final Office Action from related U.S. Appl. No. 12/851,075 dated Apr. 4, 2014.
Non-Final Office Action from related U.S. Appl. No. 12/881,110 dated Apr. 7, 2014.
Non-Final Office Action from related U.S. Appl. No. 12/880,530 dated Apr. 9, 2014.
Non-Final Office Action from related U.S. Appl. No. 12/774,380 dated Apr. 15, 2014.
Non-Final Office Action from related U.S. Appl. No. 12/881,067 dated May 9, 2014.
Intel, "Intel Ethernet Switch Converged Enhanced Ethernet (CEE) and Datacenter Bridging (DCB)", White Paper, Feb. 2009, pp. 1-14.
Non-Final Office Action from related U.S. Appl. No. 12/881,031 dated Jul. 25, 2014.
Non-Final Office Action from related U.S. Appl. No. 12/880,749 dated Jul. 30, 2014.
Non-Final Office Action from related U.S. Appl. No. 12/850,866 dated Aug. 14, 2014.
Non-Final Office Action from related U.S. Appl. No. 12/859,911 dated Aug. 14, 2014.
Non-Final Office Action from related U.S. Appl. No. 12/850,945 dated Jul. 25, 2014.
Non-Final Office Action from related U.S. Appl. No. 12/881,110 dated Sep. 17, 2014.
Non-Final Office Action from related U.S. Appl. No. 12/881,096 dated Sep. 22, 2014.
Non-Final Office Action from related U.S. Appl. No. 12/774,221 dated Jan. 28, 2015.
Non-Final Office Action from related U.S. Appl. No. 14/488,778 dated Jan. 2, 2015.
Non-Final Office Action from related U.S. Appl. No. 14/480,020 dated Dec. 31, 2014.
Non-Final Office Action from related U.S. Appl. No. 14/479,670 dated Dec. 19, 2014.
Final Office Action from related U.S. Appl. No. 12/881,031 dated Feb. 12, 2015.
Final Office Action from related U.S. Appl. No. 12/881,110 dated Feb. 18, 2015.
Non-Final Office Action from related U.S. Appl. No. 14/467,408 dated Dec. 17, 2015.
Final Office Action from related U.S. Appl. No. 12/881,096 dated Apr. 27, 2015.
Final Office Action from related U.S. Appl. No. 12/850,911 dated Mar. 20, 2015.
Final Office Action from related U.S. Appl. No. 12/880,965 dated Apr. 6, 2015.
Final Office Action from related U.S. Appl. No. 14/457,451 dated Apr. 29, 2015.
Final Office Action from related U.S. Appl. No. 14/480,020 dated May 8, 2015.
Final Office Action from related U.S. Appl. No. 14/467,408 dated May 7, 2015.
Non-Final Office Action from related U.S. Appl. No. 12/850,832 dated Jun. 3, 2015.
Non-Final Office Action from related U.S. Appl. No. 14/625,810 dated Jun. 11, 2015.
Final Office Action from related U.S. Appl. No. 12/851,075 dated Jun. 8, 2015.
Non-Final Office Action from related U.S. Appl. No. 12/881,031 dated Jul. 1, 2015.
Final Office Action from related U.S. Appl. No. 12/880,530 dated Sep. 16, 2015.
Non-Final Office Action from related U.S. Appl. No. 14/457,451 dated Sep. 22, 2015.
Final Office Action from related U.S. Appl. No. 12/850,832 dated Sep. 24, 2015.
Non-Final Office Action from related U.S. Appl. No. 14/488,778 dated Oct. 7, 2015.
Non-Final Office Action from related U.S. Appl. No. 14/480,020 dated Sep. 30, 2015.
Non-Final Office Action from related U.S. Appl. No. 14/479,670 dated Oct. 15, 2015.
Non-Final Office Action from related U.S. Appl. No. 14/467,408 dated Oct. 26, 2015.
Final Office Action from related U.S. Appl. No. 14/625,810 dated Nov. 16, 2015.
Non-Final Office Action from related U.S. Appl. No. 14/753,183 dated Nov. 6, 2015.
Non-Final Office Action from related U.S. Appl. No. 12/774,221 dated Dec. 30, 2015.
Final Office Action from related U.S. Appl. No. 14/488,778 dated Mar. 1, 2016.
Non-Final Office Action from related U.S. Appl. No. 14/851,225 dated Jan. 15, 2016.

* cited by examiner

SYSTEM AND METHOD IN A TELEVISION SYSTEM FOR PROVIDING FOR USER-SELECTION OF AN OBJECT IN A TELEVISION PROGRAM

CROSS-REFERENCE TO RELATED APPLICATIONS/INCORPORATION BY REFERENCE

This patent application is related to and claims priority from provisional patent application Ser. No. 61/242,234 filed Sep. 14, 2009, and titled "TELEVISION SYSTEM," the contents of which are hereby incorporated herein by reference in their entirety. This patent application is also related to U.S. patent application Ser. No. 12/774,380, filed May 5, 2010, titled "SYSTEM AND METHOD IN A TELEVISION FOR PROVIDING USER SELECTION OF OBJECTS IN A TELEVISION PROGRAM"; U.S. patent application Ser. No. 12/850,832, filed Aug. 5, 2010, titled "SYSTEM AND METHOD IN A DISTRIBUTED SYSTEM FOR PROVIDING USER-SELECTION OF OBJECTS IN A TELEVISION PROGRAM"; U.S. patent application Ser. No. 12/850,866, filed Aug. 5, 2010, titled "SYSTEM AND METHOD IN A TELEVISION RECEIVER FOR PROVIDING USER-SELECTION OF OBJECTS IN A TELEVISION PROGRAM"; U.S. patent application Ser. No. 12/850,911, filed Aug. 5, 2010, titled "SYSTEM AND METHOD IN A TELEVISION CONTROLLER FOR PROVIDING USER SELECTION OF OBJECTS IN A TELEVISION PROGRAM"; U.S. patent application Ser. No. 12/850,945, filed Aug. 5, 2010, titled "SYSTEM AND METHOD IN A TELEVISION CONTROLLER FOR PROVIDING USER-SELECTION OF OBJECTS IN A TELEVISION PROGRAM"; U.S. patent application Ser. No. 12/851,075, filed Aug. 5, 2010, titled "SYSTEM AND METHOD IN A PARALLEL TELEVISION SYSTEM FOR PROVIDING USER-SELECTION OF OBJECTS IN A TELEVISION PROGRAM". The contents of each of the above-mentioned applications are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Present television systems are incapable of providing for and/or conveniently providing for user-selection of objects in a television program. Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method in a television system for providing for user selection of objects in a television program, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF VARIOUS ASPECTS OF THE INVENTION

Figure 1:
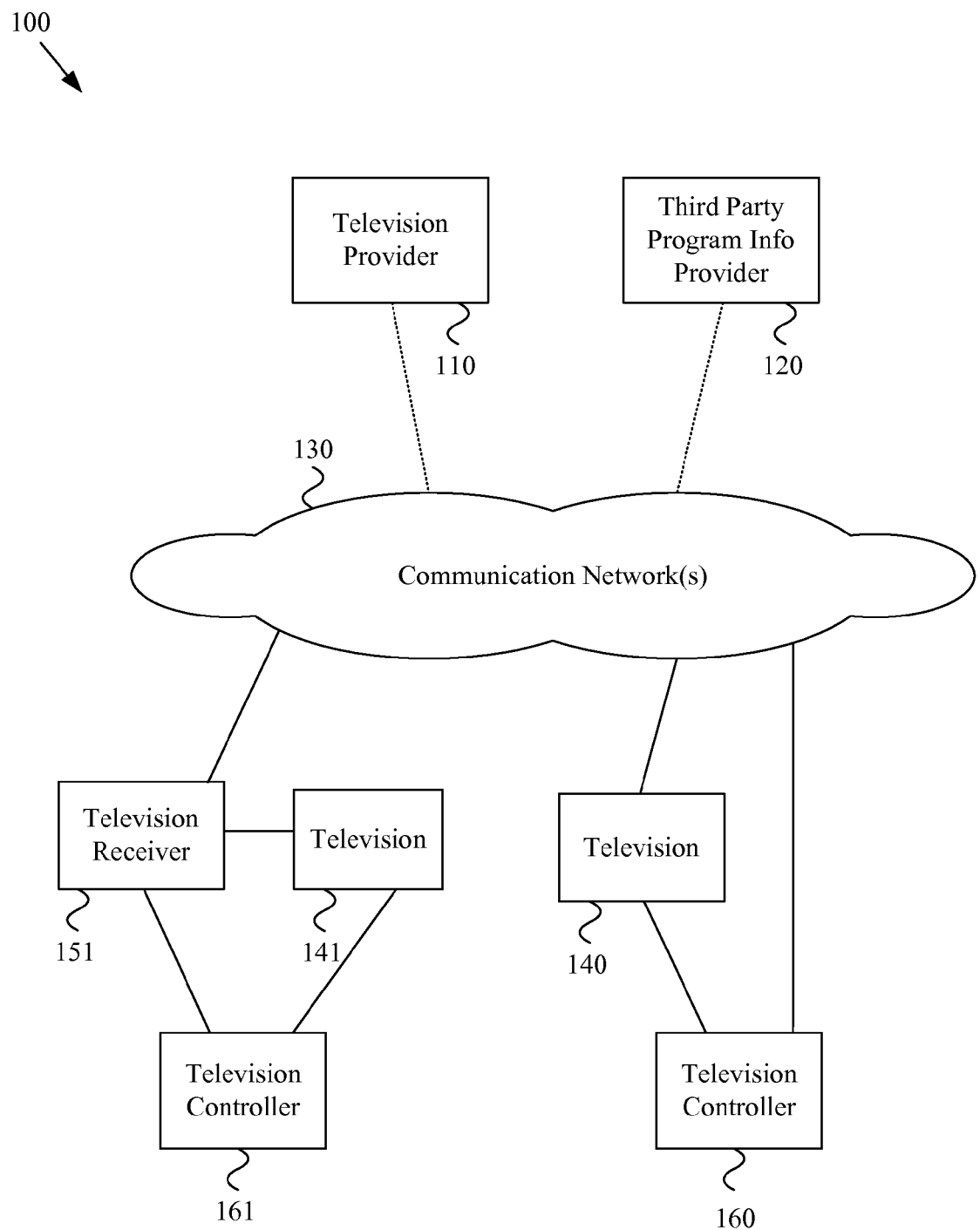
FIG. 1 is a diagram illustrating an exemplary television system, in accordance with various aspects of the present invention.

The following discussion will refer to various communication modules, components or circuits. Such modules, components or circuits may generally comprise hardware and/or a combination of hardware and software (e.g., including firmware). Such modules may also, for example, comprise a computer readable medium (e.g., a non-transitory medium) comprising instructions (e.g., software instructions) that, when executed by a processor, cause the processor to perform various functional aspects of the present invention. Accordingly, the scope of various aspects of the present invention should not be limited by characteristics of particular hardware and/or software implementations of a module, component or circuit unless explicitly claimed as such. For example and without limitation, various aspects of the present invention may be implemented by one or more processors (e.g., a microprocessor, digital signal processor, baseband processor, microcontroller, etc.) executing software instructions (e.g., stored in volatile and/or non-volatile memory). Also for example, various aspects of the present invention may be implemented by an application-specific integrated circuit ("ASIC") and/or other hardware components.

Additionally, the following discussion will refer to various television system modules (e.g., television modules, television receiver modules, television controller modules, modules of a user's local television system, modules of a geographically distributed television system, etc.). It should be noted that the following discussion of such various modules is segmented into such modules for the sake of illustrative clarity. However, in actual implementation, the boundaries between various modules may be blurred. For example, any or all of the functional modules discussed herein may share various hardware and/or software components. For example, any or all of the functional modules discussed herein may be implemented wholly or in-part by a shared processor executing software instructions. Additionally, various software sub-modules that may be executed by one or more processors may be shared between various software modules. Accordingly, the scope of various aspects of the present invention should not be limited by arbitrary boundaries between various hardware and/or software components, unless explicitly claimed.

The following discussion may also refer to communication networks and various aspects thereof. For the following discussion, a communication network is generally the communication infrastructure through which a communication device (e.g., a portable communication device, television, television control device, television provider, television programming provider, television receiver, video recording device, etc.) may communicate with other systems. For example and without limitation, a communication network may comprise a cable and/or satellite television communication network, a cellular communication network, a wireless metropolitan area network (WMAN), a wireless local area network (WLAN), a wireless personal area network (WPAN), any home or premises communication network, etc. A particular communication network may, for example, generally have a corresponding communication protocol according to which a communication device may communicate with the communication network. Unless so claimed, the scope of various aspects of the present invention should not be limited by characteristics of a particular type of communication network.

The following discussion will at times refer to an on-screen pointing location. Such a pointing location refers to a location on the television screen (e.g., a primary television screen, a secondary television screen, etc.) to which a user (either directly or with a pointing device) is pointing. Such a pointing location is to be distinguished from other types of on-screen location identification, such as, for example, using arrow keys and/or a mouse to move a cursor or to traverse blocks (e.g., on an on-screen program guide) without pointing. Various aspects of the present invention, while referring to on-screen pointing location, are also readily extensible to such other forms of on-screen location identification.

Additionally, the following discussion will at times refer to television programming. Such television programming generally includes various types of television programming (e.g., television programs, news programs, sports programs, music television, movies, television series programs and/or associated advertisements, educational programs, live or recorded television programming, broadcast/multicast/unicast television programming, etc.). Such television programming may, for example, comprise real-time television broadcast programming (or multicast or unicast television programming) and/or user-stored television programming that is stored in a user device (e.g., a VCR, PVR, etc.). Such television programming video content is to be distinguished from other non-programming video content that may be displayed on a television screen (e.g., an electronic program guide, user interface menu, a television set-up menu, a typical web page, a document, a graphical video game, etc.). Various aspects of the present invention may, for example in a television system, comprise receiving television programming, presenting such received television programming to a user at a normal presentation speed, determining that a user desires to select a user-selectable object in the television program, and in response to said determining, presenting the television program at a non-normal presentation speed and interacting with the user regarding user-selectable objects in the television program being presented at the non-normal presentation speed.

Also, the following discussion will at times refer to user-selectable objects in television programming. Such user-selectable objects includes both animate (i.e., living) and inanimate (i.e., non-living) objects, both still and moving. Such objects may, for example, comprise characteristics of any of a variety of objects present in television programming. Such objects may, for example and without limitation, comprise inanimate objects, such as consumer good objects (e.g., clothing, automobiles, shoes, jewelry, furniture, food, beverages, appliances, electronics, toys, artwork, cosmetics, recreational vehicles, sports equipment, safety equipment, computer equipment, communication devices, books, etc.), premises objects (e.g., business locations, stores, hotels, signs, doors, buildings, landmarks, historical sites, entertainment venues, hospitals, government buildings, etc.), objects related to services (e.g., objects related to transportation, objects related to emergency services, objects related to general government services, objects related to entertainment services, objects related to food and/or drink services, etc.), objects related to location (e.g., parks, landmarks, streets, signs, road signs, etc.), etc. Such objects may, for example, comprise animate objects, such as people (e.g., actors/actresses, athletes, musicians, salespeople, commentators, reports, analysts, hosts/hostesses, entertainers, etc.), animals (e.g., pets, zoo animals, wild animals, etc.) and plants (e.g., flowers, trees, shrubs, fruits, vegetables, cacti, etc.).

Turning first to FIG. 1, such figure is a diagram illustrating a non-limiting exemplary television system 100 in accordance with various aspects of the present invention. The exemplary system 100 includes a television provider 110. The television provider 110 may, for example, comprise a television network company, a cable company, a movie-providing company, a news company, an educational institution, etc. The television provider 110 may, for example, be an original source of television programming (or related information). Also for example, the television provider 110 may be a communication company that provides programming distribution services (e.g., a cable television company, a satellite television company, a telecommunication company, a data network provider, etc.). The television provider 110 may, for example, provide television programming and non-programming information and/or video content. The television provider 110 may, for example, provide information related to a television program (e.g., information describing or otherwise related to selectable objects in programming, etc.). The television provider 110 may, for example, operate to (which includes "operate when enabled to") perform any or all of the functionality discussed herein.

The exemplary television system 100 may also include a third party program information provider 120. Such a provider may, for example, provide information related to a television program. Such information may, for example, comprise information describing selectable objects in programming, program guide information, etc. The third party program information provider 120 may, for example, operate to (which includes "operate when enabled to") perform any or all of the functionality discussed herein.

The exemplary television system 100 may include one or more communication networks (e.g., the communication network(s) 130). The exemplary communication network 130 may comprise characteristics of any of a variety of types of communication networks over which television programming and/or information related to television programming (e.g., information identifying and/or describing and/or otherwise related to user-selectable objects in television programming) may be communicated. For example and without limitation, the communication network 130 may comprise characteristics of any one or more of: a cable television network, a satellite television network, a telecommunication network, a general data network, the Internet, a local area network (LAN), a personal area network (PAN), a metropolitan area network (MAN), any of a variety of different types of home networks, etc.

The exemplary television system 100 may include a first television 140. Such a first television 140 may, for example, comprise networking capability enabling such television 140 to communicate directly with the communication network 130. For example, the first television 140 may comprise one or more embedded television receivers or transceivers (e.g., a cable television receiver, satellite television transceiver, Internet modem, etc.). Also for example, the first television 140 may comprise one or more recording devices (e.g., for recording and/or playing back video content, television programming, etc.). The first television 140 may, for example, operate to (which includes "operate when enabled to") perform any or all of the functionality discussed herein.

The exemplary television system 100 may include a first television controller 160. Such a first television controller 160 may, for example, operate to (e.g., which may include "operate when enabled to") control operation of the first television 140. The first television controller 160 may comprise characteristics of any of a variety of television controlling devices. For example and without limitation, the first television controller 160 may comprise characteristics of a dedicated television control device, a universal remote control, a cellular telephone or personal computing device with television control capability, any personal electronic device with television control capability, etc. The first television controller 160 may, for example, operate to (which includes "operate when enabled to") perform any or all of the functionality discussed herein. In a non-limiting exemplary configuration, the first television controller 160 may comprise an on-board display which may operate as a television screen (e.g., a primary, secondary and/or parallel television screen) via which the first television controller 160 may present television programming and/or interface with a user regarding user-selectable objects in television programming.

The first television controller 160 (or television control device) may, for example, transmit signals directly to the first television 140 to control operation of the first television 140. The first television controller 160 may also, for example, operate to transmit signals (e.g., via the communication network 130) to the television provider 110 to control television programming (or related information) being provided to the first television 140, or to conduct other transactions (e.g., business transactions, etc.).

As will be discussed in more detail later, the first television controller 160 may operate to communicate screen pointing information with the first television 140 and/or other devices. Also, as will be discussed in more detail later, various aspects of the present invention include a user pointing to a location on a television screen (e.g., pointing to an animate or inanimate object presented in television programming). In such a scenario, the user may perform such pointing in any of a variety of manners. One of such exemplary manners includes pointing with a television control device. The first television controller 160 provides a non-limiting example of a device that a user may utilize to point to an on-screen location.

The exemplary television system 100 may also include a television receiver 151. The television receiver 151 may, for example, operate to (e.g., which may include "operate when enabled to") provide a communication link between a television and/or television controller and a communication network and/or information provider. For example, the television receiver 151 may operate to provide a communication link between the second television 141 and the communication network 130, or between the second television 141 and the television provider 110 (and/or third party program information provider 120) via the communication network 130.

The television receiver 151 may comprise characteristics of any of a variety of types of television receivers. For example and without limitation, the television receiver 151 may comprise characteristics of a cable television receiver, a satellite television receiver, etc. Also for example, the television receiver 151 may comprise a data communication network modem for data network communications (e.g., with the Internet, a LAN, PAN, MAN, telecommunication network, etc.). The television receiver 151 may also, for example, comprise recording capability (e.g., programming recording and playback, etc.). The television receiver 151 may, for example, be a stand-alone component or may be integrated with any of a variety of other television system components (e.g., a television, a video recorder, a gaming station, etc.). The television receiver 151 may, for example, operate to (which includes "operate when enabled to") perform any or all of the functionality discussed herein.

The exemplary television system 100 may include a second television controller 161. Such a second television controller 161 may, for example, operate to (e.g., which may include "operate when enabled to") control operation of the second television 141 and the television receiver 151. The second television controller 161 may comprise characteristics of any of a variety of television controlling devices. For example and without limitation, the second television controller 161 may comprise characteristics of a dedicated television control device, a dedicated television receiver control device, a universal remote control, a cellular telephone or personal computing device with television control capability, any personal electronic device with television control capability, etc.

The second television controller 161 may, for example, operate to transmit signals directly to the second television 141 to control operation of the second television 141. The second television controller 161 may, for example, operate to transmit signals directly to the television receiver 151 to control operation of the television receiver 151. The second television controller 161 may additionally, for example, operate to transmit signals (e.g., via the television receiver 151 and the communication network 130) to the television provider 110 to control television programming (or related information) being provided to the television receiver 151, or to conduct other transactions (e.g., business transactions, etc.). The second television controller 161 may further, for example, operate to receive signals from the second television 141 and/or television receiver 151. Such signals may, for example, comprise signals communicating television programming, information identifying and/or describing user-selectable objects in television programming and/or any of a variety of other information to the second television controller 161. As a non-limiting example, which will be discussed in more detail below, the second television controller 161 may comprise an on-board display which may operate as a television (e.g., a primary television, secondary television, parallel television (presenting on the on-board display a same television program as that being presented by the second television 141), etc.). In such a configuration, the second television controller 161 may, for example, operate to perform any or all of the functionality discussed herein.

As will be discussed in more detail later, various aspects of the present invention include a user pointing to a location on a television screen (e.g., pointing to an animate or inanimate object presented in television programming). In such a scenario, the user may perform such pointing in any of a variety of manners. One of such exemplary manners includes pointing with a television control device. The second television controller 161 provides one non-limiting example of a device that a user may utilize to point to an on-screen location.

The exemplary television system 100 was provided to provide a non-limiting illustrative foundation for discussion of various aspects of the present invention. Thus, the scope of various aspects of the present invention should not be limited by any characteristics of the exemplary television system 100 unless explicitly claimed.

Figure 2:
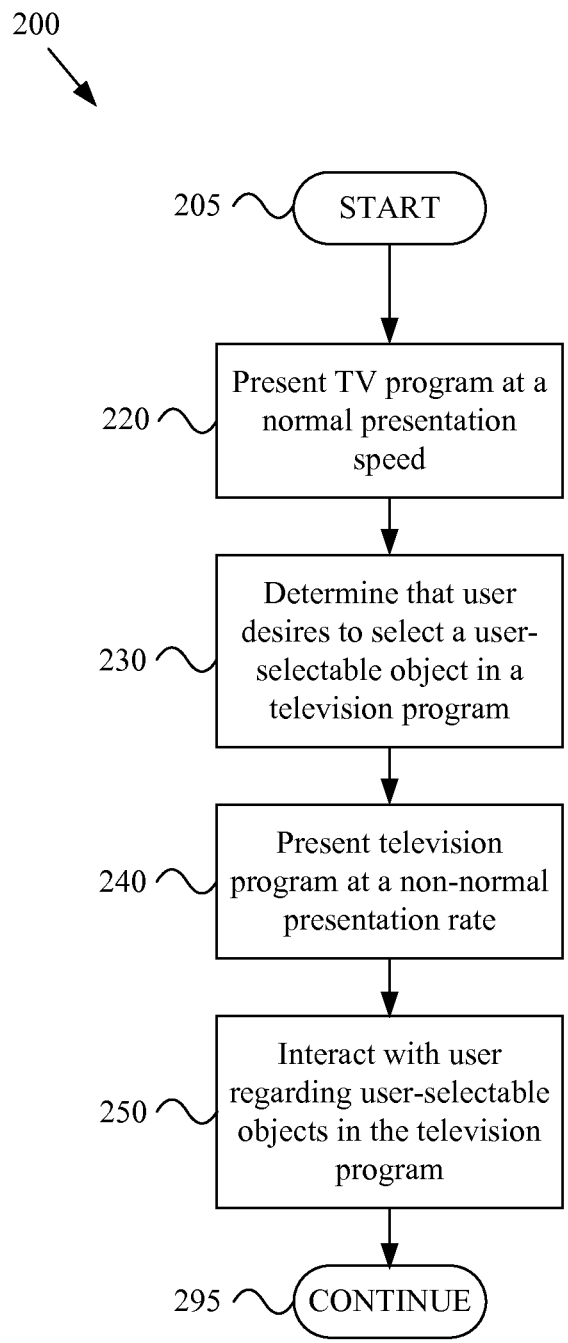
FIG. 2 is a flow diagram illustrating an exemplary method for providing for user-selection of objects in television programming, in accordance with various aspects of the present invention.

FIG. 2 is a flow diagram illustrating an exemplary method 200 for providing for user-selection of objects in television programming, in accordance with various aspects of the present invention. Any or all aspects of the exemplary method 200 may, for example, be implemented in a television system (e.g., any or all components of the television system 100, the television provider 110, the third party program information provider 120, the first television 140 and/or second television 141, the television receiver 151, the first television controller 160 and/or second television controller 161, etc., shown in FIG. 1 and discussed previously). For example, the exemplary method 200 may be implemented by one or more components of a user's local television system.

The exemplary method 200 may, for example, begin executing at step 205. The exemplary method 200 may begin executing in response to any of a variety of causes and/or conditions. For example, the exemplary method 200 may begin executing in response to a user command to begin, in response to user selection of a television program that includes user selectable objects, upon television and/or television receiver and/or television controller reset or power-up, in response to a user input indicating a desire to provide object selection capability to the user, in response to identification of a user and/or user equipment for which object selection capability is to be provided, in response to user payment of a fee, etc.

The exemplary method 200 may, for example at step 220, comprise presenting television programming at a normal presentation speed (e.g., at a typical play speed, in real-time, etc.). For example, step 220 may comprise receiving television programming. Many non-limiting examples of such television programming were provided above. Step 220 may comprise receiving the television programming from any of a variety of sources. For example and without limitation, step 220 may comprise receiving the television programming from a television broadcasting company, from a movie streaming company, from a user (or consumer) video recording device (e.g., internal and/or external to the television), from an Internet television programming provider, etc.

Step 220 may also comprise receiving the television programming via any of a variety of types of communication networks. Such networks may, for example, comprise a wireless television network (e.g., terrestrial and/or satellite) and/or cable television network. Such networks may, for example, comprise any of variety of data communication networks (e.g., the Internet, a local area network, a personal area network, a metropolitan area network, etc.).

In general, step 220 may comprise receiving television programming. The scope of various aspects of the present invention should not be limited by characteristics of any particular television programming, television programming source, television programming network or manner of receiving television programming unless explicitly claimed.

Step 220 may also, for example, comprise presenting television programming to a user. Step 220 may, for example, comprise presenting television programming received (e.g., received from a local and/or non-local television program source) to a user in any of a variety of manners. For example, step 220 may comprise presenting the television programming on a screen of a television, television controller comprising a screen, television receiver comprising a screen, personal computer system, handheld computer, etc.

The presented television programming may, for example, comprise user-selectable objects in the television programming. Many non-limiting examples of such user-selectable objects were presented above. In general, such user-selectable objects may, for example, comprise animate and/or inanimate objects in television programming that a user may select (e.g., using a pointing device, touch screen, or other user interface by which a user may identify an object in television programming being presented to the user).

The exemplary method 200 may, at step 230, comprise determining that a user desires to select a user-selectable object in a television program (e.g. the television program being presented at step 220). Step 230 may comprise performing such determining in any of a variety of manners, non-limiting examples of which will now be presented.

For example, step 230 may comprise receiving (e.g., via a user interface of a television system component) a command from a user and making such determination based, at least in part, on such received command. Such command may, for example, comprise an explicit command indicating that a user desires to select a user-selectable object in the television program (e.g., the television program being presented at step 220). Such command may also, for example, comprise a command to pause presentation of the television program (or alter presentation of the television program in any way) and/or any other type of user command by which a determination may be made to provide the user with object selection capability. In such a command-initiated scenario, step 230 may comprise providing a graphical user interface to a user by which a graphical indication (e.g., an icon, a menu item, etc.) is provided to a user, selection of which initiates the objection selection process.

Also for example, step 230 may comprise determining that a user desires to select a user-selectable object in the television program based, at least in part, on non-command user activity (i.e., based on user activity other than entering commands). For example, step 230 may comprise determining that a user desires to select a user-selectable object in the television program based, at least in part, on determining that the user is pointing at or near (and/or touching) a screen on which the television program comprising user-selectable objects is being presented. Also for example, step 230 may comprise determining that a user desires to select a user-selectable object in the television program based at least in part, on determining that the user is pointing at or near (and/or touching) a user-selectable object in television programming being presented (e.g., the television program being presented at step 220). Additionally, for example, step 230 may comprise determining that a user desires to select a user-selectable object in the television program based, at least in part, on determining that a user is pointing to (or touching) a particular area of a screen that is associated with initiating user-selection of an object. Further for example, step 230 may comprise determining that a user desires to select a user-selectable object in the television program, based, at least in part, on determining that a user is manipulating a pointing device (e.g., a television controller pointing device, a user input glove, a light pen, etc.).

In general, step 230 may comprise determining that a user desires to select a user-selectable object in a television program (e.g. the television program being presented at step 220). Accordingly, the scope of various aspects of the present invention should not be limited by characteristics of any particular manner of making such determination unless explicitly claimed.

The exemplary method 240 may, for example at step 240, comprise (e.g., in response to determining (e.g., at step 230) that a user desires to select a user-selectable object in a television program) presenting the television program at a non-normal presentation speed. Step 240 may comprise performing such television program presentation in any of a variety of manners, non-limiting examples of which will now be provided.

For example, step 240 may comprise presenting the television program in a paused (or frozen) state. Step 240 may also, for example, comprise presenting the television program at a slower-than-normal speed. Such paused and/or slower-than-normal television program presentation may assist a user in selecting certain types of user-selectable objects (e.g., relatively small user-selectable objects, relatively fast-moving user-selectable objects, user-selectable objects with relatively small appearance time windows, etc.)

Step 240 may, for example, comprise utilizing a same screen (or display) for such television program presentation as a screen utilized at step 220 for normal-speed presentation of the television program. For example, step 240 may comprise halting the normal-speed presentation of the television program at step 220 and replacing such normal-speed presentation with a non-normal speed presentation.

Also for example, step 240 may comprise utilizing a screen (or display) for such television program presentation that is different from a screen utilized at step 220 for presenting the television program at a normal presentation speed. For example, step 240 may comprise presenting the television programming on a secondary screen (or parallel television screen) at a non-normal rate while step 220 is presenting the television program at a normal presentation speed on a first screen. Such a secondary screen may, for example, comprise a screen on a television, a screen of a personal computing device or system, a screen of a television controller, a screen of a television receiver, a headset screen, eyewear, etc.

In general, step 240 may comprise (e.g., in response to determining (e.g., at step 230) that a user desires to select a user-selectable object in a television program) presenting the television program at a non-normal presentation speed. Accordingly, the scope of various aspects of the present invention should not be limited by any particular manner of presenting the television program at a non-normal presentation speed unless explicitly claimed.

The exemplary method 200 may, for example at step 250, comprise (e.g., in response to determining (e.g., at step 230) that a user desires to select a user-selectable object in a television program) interacting with the user regarding user-selectable objects in the television program being presented at the non-normal presentation speed.

For example, step 250 may comprise outputting a visible indication identifying a user-selectable object in the television program as being user-selectable. The location, shape, size, user-selection region, and/or other characteristics of such user-selectable objects may be determined in any of a variety of manners, non-limiting examples of which will now be provided.

For example, step 250 may comprise receiving information identifying and/or describing the user-selectable objects in the television program. For example, step 240 may comprise receiving information identifying and/or describing such user-selectable objects from the same source as received television programming. For example, step 240 may comprise receiving such information embedded in a same data stream as a stream communicating the presented television programming (e.g., embedded in the received television program data). For example, a television stream protocol may comprise specialized elements (and/or the utilization of unassigned elements) that include information about selectable objects (e.g., object identity, shape, location, size, coloration, movement characteristics, timing, appearance time window, etc.).

Also for example, step 250 may comprise receiving the information identifying and/or describing such user-selectable objects in a data stream communicated in parallel with a stream communicating the presented television programming. In such a scenario, the television program stream and object information stream may be received from a same source over a same television programming communication channel. Additionally for example, step 250 may comprise receiving such information from a same source but over a communication channel different from the channel over which the television programming is received and/or over a type of communication channel different from a television programming communication channel.

Further for example, step 250 may comprise receiving the information identifying and/or describing such user-selectable objects from a source (e.g., a third party information provider, a television network source, etc.) different from the source from which the television programming is received. In such an exemplary scenario, step 250 may comprise receiving such information via different respective communication networks or via one or more same communication networks. Also for example, step 250 may comprise receiving such information over a different communication medium than that over which the television programming is received.

Step 250 may, for example, comprise receiving the information identifying and/or describing such user-selectable objects in a data stream, where such information is always transmitted in the data stream (e.g., whether or not requested by a user and/or other system). Alternatively for example, step 250 may comprise receiving such information, where such information is communicated (e.g., to the one or more television system components implementing the exemplary method 200) only when requested (e.g., only when requested by the television, by a television controller, by a television receiver, by a user electronic device, by the user, etc.).

Step 250 may, for example, comprise receiving the information identifying and/or describing such user-selectable objects in real-time (i.e., as the television programming is received). Also for example, step 250 may comprise receiving such information from a source of user-stored television programming. For example, such information may be stored with stored television programming in a user storage device (e.g., in a same data file, in separate but related files, etc.). In such an exemplary implementation, such information may be received from the user's television programming storage device in time synchronization with television programming.

The information identifying and/or describing user selectable objects in television programming may comprise timing information associated with such selectable objects. For example, movement of a selectable object may be expressed as a function of time. Also for example, appearance of a selectable object in television programming may be associated with a time window during which such object appears. As will be discussed in more detail below, timing associated with a user on-screen pointing (or object selection) event may be synchronized to the timing of selectable object location in a presented program to determine whether a user pointed to (or selected) a particular object at a particular location at a particular time.

The information identifying and/or describing user selectable objects in television programming may comprise information defining respective regions of the presented television programming that are associated with respective user-selectable objects in the presented television programming. For example, such information may comprise information describing respective geometric shapes (e.g., 2-D and/or 3-D geometric constructs) associated with respective user-selectable objects. For example, a circle, oval, square, rectangle, pentagon or any polygon may be associated with a user-selectable object. As will be discussed below, user-selection of one of such geometric shapes (e.g., a determined on-screen pointing location within the boundaries of such geometric shape(s) at the relevant point in time) may indicate user selection of the respective object.

As discussed above, the object description (whether geometric or not) may comprise information (e.g., temporal information) describing movement, appearance, size changing, shape changing, etc. associated with the user-selectable object. For example, in an exemplary scenario where a plurality of geometric shapes are utilized to describe a user-selectable object (and/or a user-selectable area associated with such object), the description of the user-selectable object may comprise information describing the manner in which each of the respective objects move in the programming (e.g., as a function of time, as a function of video frame number, etc.) and/or information describing the manner in which dimensions of each of the respective objects change.

Once information describing or otherwise indicating user-selectable objects in the television programming is received (or otherwise determined), step 250 may comprise providing a user-perceivable indication identifying such user-selectable objects. For example, step 250 may comprise outputting any of a variety of visible indicia on the screen (e.g., the same screen on which the television programming is being presented by step 240) to identify the user-selectable objects in the television programming as being user-selectable. For example, step 250 may comprise highlighting such objects, outlining such objects, enclosing such objects in a circle square or other polygon, presenting such objects with a particular brightness and/or color indicative of user-selectable objects, highlighting respective selection regions that must be selected by the user to select respective objects, superimposing a dot or target on each user-selectable object, etc. Such graphical features may, for example, be overlaid, blended or otherwise superimpose on the television program being presented at step 240.

Step 250 may, for example, comprise outputting visible indications identifying respective user-selectable objects where such indications are not output on television programming being presented at a normal presentation speed (e.g., at step 220). In such an exemplary scenario, a television program may be presented to a user in a normal manner until it is determined that the user desires to select a user-selectable object in the television program. At such point, the television program may be paused, and user-selectable objects being displayed on the screen may be identified to the user.

As discussed previously, a user may identify user-selectable objects in the television program (e.g., as presented at step 240) by pointing to such objects on the screen. Examples of such pointing may, for example, comprise touching an object being presented on a touch screen and/or pointing to the object in any of a variety of manners. In such a scenario, step 250 may comprise identifying an on-screen pointing location being pointed to by the user. In such a scenario, step 250 may comprise determining an on-screen pointing location in any of a variety of manners, non-limiting examples of which will now be provided. Various non-limiting examples of on-screen pointing location determining are also provided in U.S. Provisional Application No. 61/242,234, which is hereby incorporated herein by reference in its entirety.

An on-screen pointing location may, for example, be expressed in a screen-centric coordinate system (e.g., x-y pixel coordinates), a screen independent coordinate system (e.g., based on location within a moving image, where such location is generic to all television screens), a world coordinate and/or universal coordinate system, a video frame-based coordinate system, etc.

Step 250 may, for example, comprise the television system (e.g., any one or more components thereof) analyzing sensor information (e.g., associated with sensors on-board and/or off-board the television) to determine user on-screen pointing location. Step 250 may also, for example, comprise the one or more components implementing step 250 receiving information describing the on-screen pointing location from a device (e.g., a television receiver, a television controller, a television network device, a user pointing device, etc.) external to such one or more components.

Step 250 may also, for example, comprise identifying a timestamp temporally identifying the instance of a determined on-screen pointing location. Such timestamp may, for example, be obtained by a clock, timestamp embedded in a video stream, timestamp embedded in a stream including object information, timestamp associated with a signal transmitted from a user pointing device, etc. Determination of such a timestamp may, for example, be based on user command (e.g., a user indicating that a selection has occurred) or automatically without a direct indication from the user that a selection has occurred (e.g., the system determining that the user has pointed to an object for at least a particular amount of time), etc. Such timestamp may be utilized, for example, for determining selection of a moving, changing and/or temporally transient object in the presented television programming.

Once on-screen (or in-program) pointing location is determined, step 250 may comprise providing a user-perceivable indication identifying such on-screen location. For example, step 250 may comprise outputting any of a variety of visible indicia on the screen (e.g., the same screen on which the television programming is being presented by step 240) to identify the on-screen pointing location. For example, step 250 may comprise outputting a cursor, icon, crosshairs, light spot, dot, target, or any of a variety of graphical features on the screen to provide an indication to the user as to where on the screen the user is pointing. Such graphical features may, for example, be overlaid, blended or otherwise superimpose on the television program being presented at step 240.

Step 250 may, for example, comprise outputting a visible indication identifying on-screen pointing location where such indication is not output on television programming being presented at a normal presentation speed (e.g., at step 220). In such an exemplary scenario, a television program may be presented to a user in a normal manner until it is determined that the user desires to select a user-selectable object in the television program. At such point, the television program may be paused, and an indication of on-screen pointing location may be provided to the user.

As discussed above, step 250 may comprise interacting with the user regarding user-selectable objects in the television program, where such interaction may comprise outputting visible indications identifying user-selectable objects as being selectable and/or by outputting a visible indication of on-screen pointing location. Step 250 may also, for example, comprise identifying a user-selectable object being selected by a user, and outputting an indication of the identified object on the screen.

Step 250 may comprise identifying a user-selectable object in any of a variety of manners, non-limiting examples of which will now be provided. For example, step 250 may comprise identifying a user-selectable object in the presented television programming (e.g., the television programming being presented at step 240) at which the user is pointing based, at least in part, on the determined on-screen pointing location and user-selectable object description information discussed previously.

For example, step 250 may comprise determining the on-screen location and/or dimensions of one or more user-selectable objects (e.g., or associated selection region) in the presented television programming, and identifying a user-selected object by analyzing the respective on-screen locations of the one or more user-selectable objects and the determined on-screen pointing location (e.g., at a particular time instance and/or particular timeframe) to determine the television programming object selected by the user. For example, such on-screen location may, for example, comprise the on-screen location of one or more points, areas and/or volumes associated with respective locations of user-selectable objects.

Step 250 may, for example, comprise processing on-screen pointing location and object location information to determine a user-selectable object to which a user is pointing. Such processing may comprise determining a respective region of the television screen and/or a television programming frame associated with a respective user-selectable object, where the respective region correlates to an on-screen pointing location pointed to by the user (e.g., at a particular point in time or during a particular timeframe). In an exemplary scenario, step 250 may comprise identifying the user-selectable object in the television program that spatially occupies the user's on-screen pointing location at a particular point in time. In a non-limiting scenario, a user may point to (or otherwise indicate) a location on a television screen that is presently occupied by a particular user-selectable hockey player. In such a scenario, step 250 may comprise correlating the on-screen pointing location and the hockey player's location to determine that the user has selected the hockey player.

During performing such object identification processing, step 240 may comprise low-pass filtering the determined on-screen pointing location to compensate for unintended movement of pointing location (e.g., due to unsteady or unstable user pointing), thus increasing reliability of object selection determination. For example, successful user-selection of a television programming object may require a user to point to an on-screen object for a particular amount of time (or for a particular number of frames).

Note that such low-pass filtering may for example, comprise filtering over a particular period of time, over a particular number of on-screen pointing location determinations, over a particular number of television programming frames, etc. Such filtering may comprise averaging a plurality of on-screen pointing location determinations, utilizing a finite impulse response filtering scheme, etc.

Step 250 may also, for example, comprise identifying a user-selected object by identifying a most likely object selected by the user. For example, step 250 may comprise identifying a closest user-selectable object to the determined on-screen pointing location. Also for example, step 250 may comprise determining a most likely user-selected object based, at least in part, on respective popularity of user selectable objects (e.g., favoring the most often selected inanimate and/or animate objects). Additionally for example, step 250 may comprise identifying a most likely user-selected object based, at least in part, on monetary considerations (e.g., placing a higher likelihood on user-selectable objects associated with relatively higher paying advertisers, placing a higher likelihood on user-selectable objects associated with a per-selection based advertising fee, etc.). Further for example, step 250 may comprise identifying a most likely user-selected programming object based on history of selection from a particular user (e.g., favoring types of objects most often selected by a particular user). Also for example, step 250 may comprise identifying a most likely user-selected programming object based on object newness (e.g., a new object is likely to garner more interest than an object that has been shown for a relatively long period of time). Additionally, for example, step 250 may comprise identifying a most likely user-selected television programming object based on object size.

Once a user-selected object in the television programming has been identified, step 250 may comprise providing a user-perceivable indication identifying such object. For example, step 250 may comprise outputting any of a variety of visible indicia on the screen (e.g., the same screen on which the television programming is being presented by step 240) to identify the user-selected object. For example, step 250 may comprise outputting a cursor, icon, crosshairs, light spot, dot, target, or any of a variety of graphical features on the screen to indicate the user-selected object. For example, as discussed above, a user-selectable object (and/or the user-selectable portion of a user-selectable object) may be defined by one or more geometric shapes. In such an exemplary scenario, step 250 may comprise highlighting such geometric shapes (or the borders thereof) when step 250 determines that the user has selected a user-selectable object associated with such geometric shapes. Also for example, step 250 may comprise presenting an outline of the identified object on the television screen, temporarily brighten or alter the color of the identified object, etc. Such graphical features may, for example, be overlaid, blended or otherwise superimpose on the television program being presented at step 240.

Additionally, for example, step 250 may comprise outputting textual information corresponding to the user-selected object (e.g., object name, object statistics, object location, object availability, commercial source and/or availability of such object, history of such object, personal information about a selected person, location of additional information, information of additional actions that the user may request regarding the user-selected object, etc.). For example, step 250 may comprise presenting such information in an on-screen information bubble, a ticker tape, a scrolling information window, etc. In an exemplary scenario in which step 240 comprise presenting a paused television program to the user, step 250 may comprise presenting such textual information on such paused television program (e.g., overlaid on the user-selected object and/or offset from the user-selected object).

Note that in various non-limiting exemplary scenarios, step 250 may also, for example, comprise outputting one or more audio indications associated with a selected object. Such audio indications may, for example, comprise outputting an audio indication notifying the user that a user-selected object has been identified, that a user-selected object has not been identified, that a particular type of user-selected object has been identified, etc. Such audio indication may also, for example, comprise an audio presentation of information associated with a particular selected object.

Step 250 may, for example, comprise outputting a visible indication identifying the user-selected object where such indication is not output on television programming being presented at a normal presentation speed (e.g., at step 220). In such an exemplary scenario, a television program may be presented to a user in a normal manner until it is determined that the user desires to select a user-selectable object in the television program. At such point, the television program may be paused, and an indication of a user-selected object in such television program may be provided to the user.

As discussed previously with regard to step 240, such step may comprise presenting the television program at a non-normal presentation speed on a second screen while the television program is being presented at the normal presentation speed on a first screen (e.g., at step 220). In such a scenario, step 250 may comprise interacting with the user on the second screen while the television program is being presented at the normal presentation speed on the first screen and being presented at the non-normal presentation speed on the second screen. In a non-limiting exemplary scenario, steps 240 and 250 may be performed on a parallel television screen on a television controller, while step 220 is performed on a television screen.

Also as explained previously, step 240 may, for example, comprise utilizing a same screen (or display) for such television program presentation as a screen utilized at step 220 for normal-speed presentation of the television program. For example, step 240 may comprise halting the normal-speed presentation of the television program at step 220 and replacing such normal-speed presentation with a non-normal speed presentation. In such a scenario, step 250 may comprise interacting with the user on the first screen while the television program is being presented at the non-normal presentation speed on the first screen. In a non-limiting exemplary scenario, steps 220, 240 and 250 may all be performed on a single television screen.

As discussed above, step 250 may comprise outputting any of a variety of different types of information regarding a user-selected object in a television program. Step 250 may also comprise interacting with the user in any of a variety of other manners regarding a user selected object. For example, step 250 may comprise providing a user interface (e.g., a graphical user interface) to the user for further interaction regarding a user-selected object. Such user interface may, for example, be presented on the same screen as the screen on which the television programming is being presented at step 240.

For example, user-selection of an object may merely serve as a starting point for any of a large variety of different types of user activities regarding a user-selected object. For example, step 250 may comprise presenting a user interface by which a user may perform a commercial transaction associated with a user-selected object (e.g., ordering such object from a vendor directly, via the Internet, via a phone representative, via the mail, etc.). Also for example, step 250 may comprise presenting a user interface by which a user may obtain information regarding the user-selected objects (e.g., address information, Internet address information, website information, blog information, customer service information, contact information, fan club information, critic information, product review information, historical information, location and/or travel information, tour information, manufacturer information, FAQs concerning such object, user group information, etc.).

As discussed above, step 240 may comprise presenting the television program at a non-normal presentation speed (e.g., in a paused state, at a slower-than-normal speed, etc.). In such a scenario, depending on the nature of the television program source, a time discrepancy may develop between real-time presentation of the television program and the television program being presented at step 240. In other words, in a scenario where a television program is being broadcast to a television system for presentation on the television system in real-time, while performing steps 240 and 250, presentation of the television program on the television system will fall behind the real-time broadcast of the television program.

In such a scenario, step 250 (or step 240) may comprise recording television programming that is received by the television system while step 240 and/or step 250 are being performed. For example, while presentation of the television program is paused or slowed, step 250 may comprise recording the portion of the television program that was received but not presented to the user. For example, step 250 may comprise storing such received television programming on a hard drive, in general volatile and/or non-volatile memory, on a local disc drive, on a remote networked drive, etc. Such recorded programming may then, for example, be provided to the user at the user's convenience (e.g., when the step 250 interaction with the user is complete).

In general, step 250 may comprise (e.g., in response to determining (e.g., at step 230) that a user desires to select a user-selectable object in a television program) interacting with the user regarding user-selectable objects in the television program being presented at the non-normal presentation speed. Accordingly, the scope of various aspects of the present invention should not be limited by any particular manner of performing such interacting unless explicitly claimed.

The exemplary method 200 may, for example at step 295, comprise performing continued operation. Such continued operation may comprise characteristics of any of a variety of different types of operation, non-limiting examples of which will now be provided.

For example, step 295 may comprise returning execution flow to any of the previously discussed method steps. For example, step 295 may comprise returning execution flow of the exemplary method 200 to steps 240 and/or 250 for continued presentation of the television program at a non-normal presentation rate and/or continued interaction with the user regarding user-selectable objects in such television programming.

Also for example, step 295 may comprise determining when the interacting being performed at step 250 is complete. Step 295 may, for example, comprise making such a determination in any of a variety of manners. For example and without limitation, step 295 may comprise determining that the interacting is complete based, at least in part, on explicit user command indicating that the user no longer desires to select objects in the television programming. Also for example, step 295 may comprise determining that the interacting is complete based, at least in part, on user dismissal of information associated with a user-selected object (e.g., closing an information window and/or other GUI mechanism associated with the user-selected object). Additionally for example, step 295 may comprise determining that the interacting is complete based, at least in part, on a timer (e.g., making such determination a predetermined amount of time after an information and/or a GUI interface is presented to a user, after a user has last interacting with the system regarding a user-selected object, etc.). Further for example, step 295 may comprise determining that the interacting is complete based on a user command to perform some other action (e.g., a user command for playback to resume, a user command for playback to fast-forward until caught up to real-time, a user command to jump presentation of the television program to real-time, etc.).

After determining that the user interacting is complete, step 295 may comprise performing any of a variety of follow-up activities. For example, step 295 may comprise returning execution flow of the exemplary method to step 220 for resuming presentation of the television programming at a normal presentation speed. In an exemplary scenario in which step 240 pauses presentation of the television program, step 295 may comprise resuming presentation of the television program at the point at which presentation of the television program was paused.

Also for example, step 295 may comprise providing a user interface by which a user may synchronize (or resynchronize) presentation of the television program to real-time (e.g., to temporally match presentation of the television program to a real-time broadcast of the television program). For example, such user interface may comprise a fast-forward playback option by which a user may quickly view activity that occurred in the television program while interacting with the television system about user-selectable objects. Also for example, such user interface may comprise a skip ahead option by which a user may skip the portion of the television program that occurred while the user was interacting with the television system about user-selectable objects.

As discussed previously, step 250 comprises interacting with the user regarding user-selectable objects in the television programming. The exemplary method 200 may also, for example, comprise interacting with other system components regarding identified user-selectable objects. For example, step 295 may comprise communicating information indicating an identified user-selectable object to a device external to the television system component(s) implementing the exemplary method 200. In an exemplary scenario in the exemplary method 200 is implemented by one or more components of the user's local television system, step 295 may comprise communicating information of user-selectable objects to one or more television system components remote from the user's local television system (e.g., television provider components, advertiser components, product supplier components, central devices for monitoring user selection of objects, etc.).

In general, step 295 may comprise performing continued operations (e.g., performing additional operations corresponding to a user-selected television programming object, repeating various method steps for additional user-selected objects, etc.). Accordingly, the scope of various aspects of the present invention should not be limited by characteristics of any particular type of continued processing unless explicitly claimed.

The steps of the exemplary method 200 (or aspects thereof) may, for example, be performed (e.g., by a television) in real-time. In such manner, the user may have relatively expeditious access to functionality associated with the user-selected object. Alternatively for example, the exemplary method 200 (or aspects thereof) may be performed off-line in a manner in which functionality associated with the user-selected object is provided to the user at a later time (e.g., after presentation of the television program, upon the user logging into the user's computer system, upon the user accessing email, etc.).

As mentioned above, any or all of the steps of the exemplary method 200 may be performed for user selection of an object in television programming as the programming is broadcast in real-time and/or may be performed for user selection of an object in television programming that has been recorded on a user (or home) television programming recorder (e.g., a personal video recorder (PVR), video cassette recorder (VCR), etc.) and is currently being presented to the user (e.g., at step 220) in a time-shifted manner. For example, a user may record a broadcast television program on a PVR for later viewing, view such recorded programming at a later time, and while viewing such time-shifted television programming at a later time, select user-selectable objects in such programming.

Similarly, any or all of the steps of the exemplary method 200 may be performed for user selection of an object in television programming that has been provided to the user (or stored by the user) on a physical storage medium (e.g., on a digital versatile disc (DVD), video cassette recorder tape, non-volatile memory device, etc.). For example, a user may purchase a set of DVDs including all episodes of a season of a television series, view each of such episodes at the convenience of the user, and while viewing such episodes, select user-selectable objects in such programming.

In an exemplary scenario, where on-screen pointing location at a particular point in time is utilized to determine object selection, any of a variety of time references may be utilized. For example, synchronization of on-screen pointing location and user-selectable object location (e.g., on-screen and/or in-frame object location) may be based on a presentation timestamp (PTS) and/or a decoding timestamp (DTS), or the like, which may be encoded in a broadcast and/or recorded program or determined as such program is being displayed to a user. In such a scenario, so long as the object location and pointing determination are based on a common and/or synchronized time reference, the identification of a pointed-to object may be performed accurately.

As mentioned previously, object information identifying and/or describing user-selectable objects may be received encoded in a video program stream or may be received in a separate stream (and/or channel). In a scenario where television programming information is stored (either short term or long term), the object information may also be stored (e.g., with the stored programming information in a same data file, in a separate but related data file, etc.). In such a manner, when the user determines to view a time-shifted program, the object information is accessible to the television.

Alternatively, such information identifying and/or describing user-selectable objects in programming may be requested from a third party when such information is needed. In yet another scenario, for example, where video information may be decoded separately from the television (e.g., in a set top box (STB), cable and/or satellite television receiver, PVR, etc.) and provided to the television for presentation, such object information may also be received by such separate device and provided to the television (e.g., in an information channel separate from a video driver signal).

Note that although a portion of the previous discussion concerned analyzing on-screen pointing location and on-screen object location to identify a user-selected object, such analysis may also be similarly performed by analyzing on-frame pointing location and on-frame object location. In other words, such analysis may comprise performing any of a variety of coordinate transformations to perform such analysis in any of a variety of different respective coordinate domains.

Figure 3:
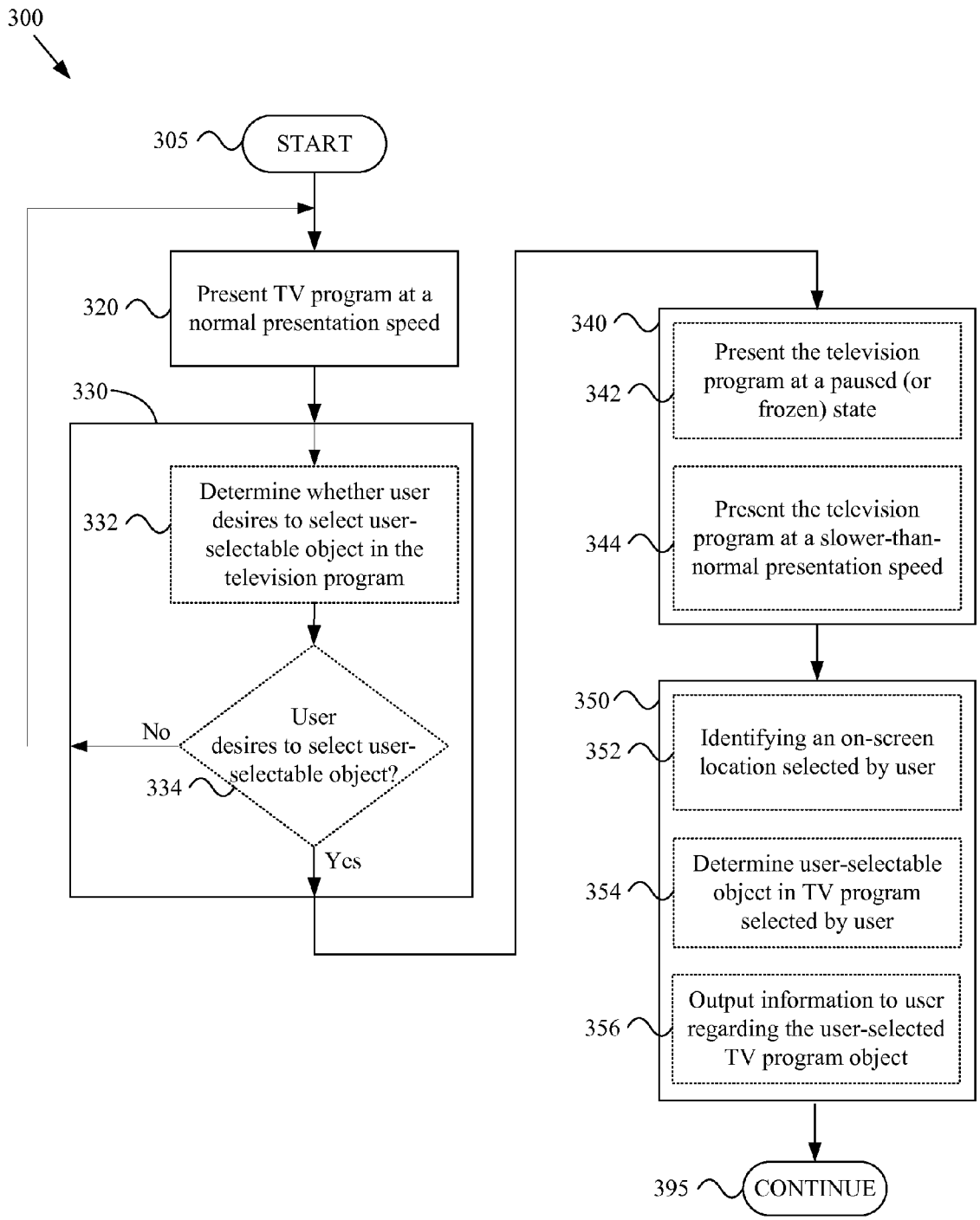
FIG. 3 is a flow diagram illustrating an exemplary method for providing for user-selection of objects in television programming, in accordance with various aspects of the present invention.

Turning next to FIG. 3, such figure is a flow diagram illustrating an exemplary method 300 for providing user-selection of objects in television programming, in accordance with various aspects of the present invention. The exemplary method 300 may, for example, share any or all characteristics with the exemplary method 200 illustrated in FIG. 2 and discussed previously. Any or all aspects of the exemplary method 200 may, for example, be implemented in a television system (e.g., any or all components of the television system 100, the television provider 110, the third party program information provider 120, the first television 140 and/or second television 141, the television receiver 151, the first television controller 160 and/or second television controller 161, etc., shown in FIG. 1 and discussed previously). For example, the exemplary method 200 may be implemented by one or more components of a user's local television system.

The exemplary method 300 may, for example, begin executing at step 305. The exemplary method 300 may begin executing in response to any of a variety of causes or conditions. Step 305 may, for example, share any or all characteristics with step 205 of the exemplary method 200 illustrated in FIG. 2 and discussed previously.

The exemplary method 300 may, for example at step 320, comprise presenting television programming at a normal presentation speed. Step 320 may, for example, share any or all characteristics with step 220 of the exemplary method 200 illustrated in FIG. 2 and discussed previously.

The exemplary method 300 may, for example at step 330, comprise determining that a user desires to select a user-selectable object in a television program (e.g. the television program being presented at step 220). Step 330 may, for example, share any or all characteristics with step 230 of the exemplary method 200 illustrated in FIG. 2 and discussed previously.

For example, step 330 may comprise, for example at sub-step 332, determining whether a user desired to select a user-selectable object in the television program. Step 330 may then, for example, at flow control step 334, comprise directing execution flow of the exemplary method 300 back up to step 320 and/or step 330 if it is determined at step 332 that the user does not currently desire to select a user-selectable object in the television program. If, however, it is determined at step 332 that the user desires to select a user-selectable object in the television program, then sub-step 334 may direct execution flow of the exemplary method 300 to step 340.

The exemplary method 300 may, for example at step 340, comprise (e.g., in response to determining (e.g., at step 230) that a user desires to select a user-selectable object in a television program) presenting the television program at a non-normal presentation speed. Step 340 may, for example, share any or all characteristics with step 240 of the exemplary method 200 illustrated in FIG. 2 and discussed previously.

For example, step 340 may comprise, for example at sub-step 342, presenting the television program at a paused (or frozen) state. Alternatively for example, step 340 may comprise, for example at sub-step 344, presenting the television program at a slower-than-normal presentation speed.

The exemplary method 300 may, for example at step 350, comprise (e.g., in response to determining (e.g., at step 230) that a user desires to select a user-selectable object in a television program) interacting with the user regarding user-selectable objects in the television program being presented at the non-normal presentation speed. Step 350 may, for example, share any or all characteristics with step 250 of the exemplary method 200 illustrated in FIG. 2 and discussed previously.

For example, step 350 may comprise, for example at sub-step 352, identifying an on-screen location selected by the user. Step 350 may also, for example at sub-step 354, comprise determining a user-selectable object in the television program that has been selected by the user. Step 350 may additionally, for example, at sub-step 356, comprise outputting information to the user regarding the user-selected television program object.

The exemplary method 300 may, for example at step 395, comprise performing continued operations. Step 395 may, for example, share any or all characteristics with step 295 of the exemplary method 200 illustrated in FIG. 2 and discussed previously.

Figure 4:
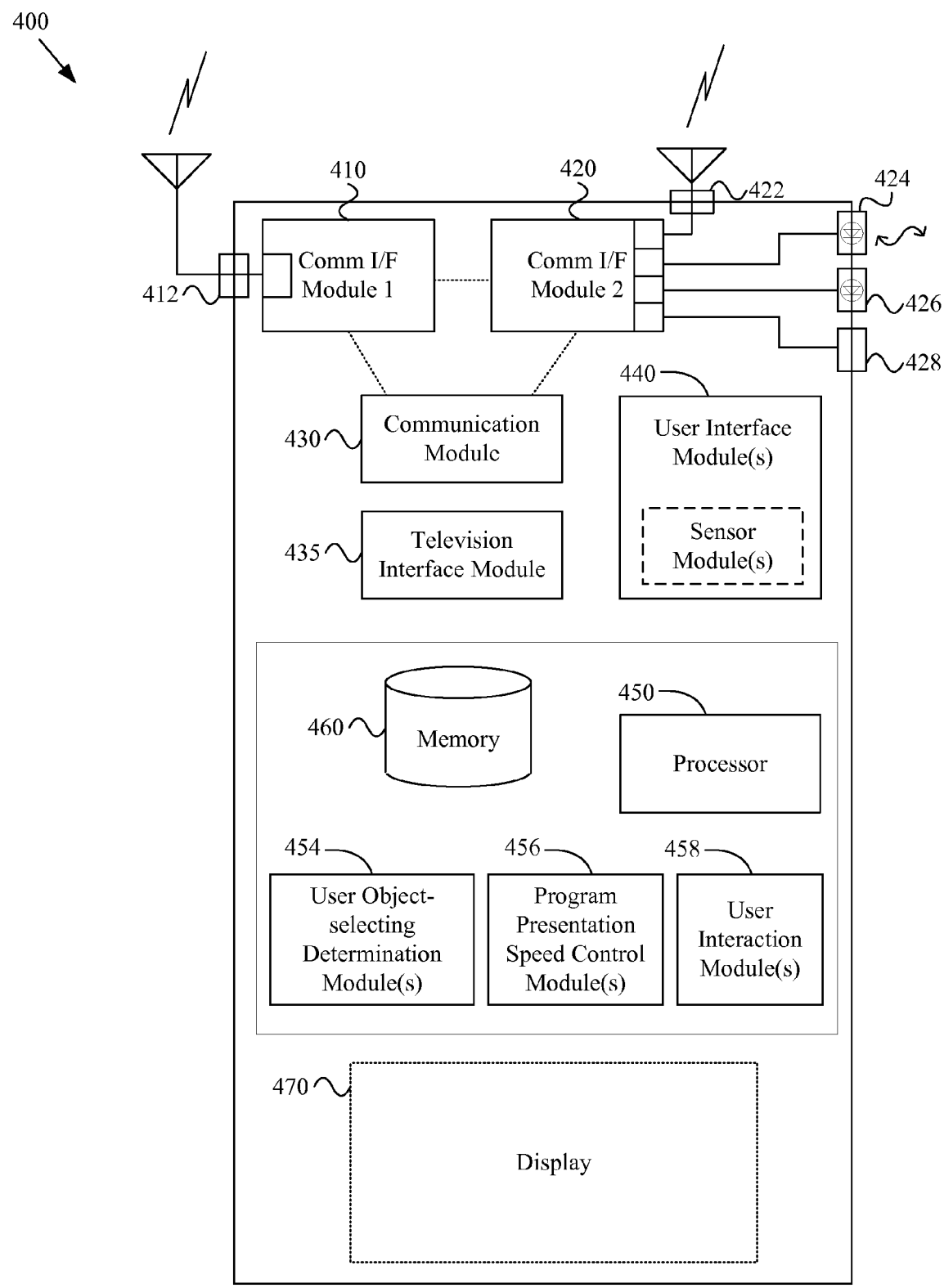
FIG. 4 is a diagram illustrating an exemplary television system, in accordance with various aspects of the present invention.

Turning next to FIG. 4, such figure is a diagram illustrating an exemplary television system 400 (e.g., one or more of a television, television receiver, television controller, etc.), in accordance with various aspects of the present invention. The exemplary television system 400 may, for example, share any or all characteristics with one or more of the exemplary televisions 140 and 141, television controllers 160 and 161, television receiver 151, television provider 110 and/or third party program information provider illustrated in FIG. 1 and discussed previously. Also, the exemplary television system 400 (e.g., various modules thereof) may operate to perform any or all of the functionality discussed previously with regard to the exemplary methods 200 and 300 illustrated in FIGS. 2-3 and discussed previously.

The exemplary television system 400 includes a first communication interface module 410. The first communication interface module 410 may, for example, operate to communicate over any of a variety of communication media and utilizing any of a variety of communication protocols. For example, though the first communication interface module 410 is illustrated coupled to a wireless RF antenna via a wireless port 412, the wireless medium is merely illustrative and non-limiting. The first communication interface module 410 may, for example, operate to communicate with one or more communication networks (e.g., cable television networks, satellite television networks, telecommunication networks, the Internet, local area networks, personal area networks, metropolitan area networks, etc.) via which television video content (e.g., television programming) and/or other data is communicated. Also for example, the first communication interface module 410 may operate to communicate with local sources of television video content (e.g., video recorders, receivers, gaming devices, etc.). Additionally, for example, the first communication interface module 410 may operate to communicate with a television controller (e.g., directly or via one or more intermediate communication networks).

The exemplary television system 400 includes a second communication interface module 420. The second communication interface module 420 may, for example, operate to communicate over any of a variety of communication media and utilizing any of a variety of communication protocols. For example, the second communication interface module 420 may communicate via a wireless RF communication port 422 and antenna, or may communicate via a non-tethered optical communication port 424 (e.g., utilizing laser diodes, photodiodes, etc.). Also for example, the second communication interface module 420 may communicate via a tethered optical communication port 426 (e.g., utilizing a fiber optic cable), or may communicate via a wired communication port 428 (e.g., utilizing coaxial cable, twisted pair, HDMI cable, Ethernet cable, any of a variety of wired component and/or composite video connections, etc.). The second communication interface module 420 may, for example, operate to communicate with one or more communication networks (e.g., cable television networks, satellite television networks, telecommunication networks, the Internet, local area networks, personal area networks, metropolitan area networks, etc.) via which television video content (e.g., television programming) and/or other data is communicated. Also for example, the second communication module 420 may operate to communicate with local sources of television video content (e.g., video recorders, receivers, gaming devices, etc.). Additionally, for example, the second communication module 420 may operate to communicate with a television controller (e.g., directly or via one or more intervening communication networks).

The exemplary television system 400 may also comprise additional communication interface modules, which are not illustrated. Such additional communication interface modules may, for example, share any or all aspects with the first 410 and second 420 communication interface modules discussed above.

The exemplary television system 400 may also comprise a communication module 430. The communication module 430 may, for example, operate to control and/or coordinate operation of the first communication interface module 410 and the second communication interface module 420 (and/or additional communication interface modules as needed). The communication module 430 may, for example, provide a convenient communication interface by which other components of the television system 400 may utilize the first 410 and second 420 communication interface modules. Additionally, for example, in an exemplary scenario where a plurality of communication interface modules are sharing a medium and/or network, the communication module 430 may coordinate communications to reduce collisions and/or other interference between the communication interface modules.

The exemplary television system 400 may additionally comprise one or more user interface modules 440. The user interface module 440 may generally operate to provide user interface functionality to a user of the television system 400. For example, and without limitation, the user interface module 440 may operate to provide for user control of any or all standard television commands (e.g., channel control, volume control, on/off, screen settings, input selection, etc.). The user interface module 440 may, for example, operate and/or respond to user commands utilizing user interface features disposed on the television (e.g., buttons, etc.) and may also utilize the communication module 430 (and/or first 410 and second 420 communication interface modules) to communicate with a television controller (e.g., a dedicated television remote control, a universal remote control, a cellular telephone, personal computing device, gaming controller, etc.).

The user interface module 440 may also comprise one or more sensor modules that operate to interface with and/or control operation of any of a variety of sensors that may be utilized to ascertain an on-screen pointing location. For example and without limitation, the user interface module 440 (or sensor module(s) thereof) may operate to receive signals associated with respective sensors (e.g., raw or processed signals directly from the sensors, through intermediate devices, via the communication interface modules 410, 420, etc.). Also for example, in scenarios in which such sensors are active sensors (as opposed to purely passive sensors), the user interface module 440 (or sensor module(s) thereof) may operate to control the transmission of signals (e.g., RF signals, optical signals, acoustic signals, etc.) from such sensors. Additionally, the user interface module 440 may perform any of a variety of video output functions (e.g., presenting television programming to a user, providing visual feedback to a user regarding an identified user-selected object in the presented television programming, etc.).

The exemplary television system 400 may comprise one or more processors 450. The processor 450 may, for example, comprise a general purpose processor, digital signal processor, application-specific processor, microcontroller, microprocessor, etc. For example, the processor 450 may operate in accordance with software (or firmware) instructions. As mentioned previously, any or all functionality discussed herein may be performed by a processor executing instructions. For example, though various modules are illustrated as separate blocks or modules in FIG. 4, such illustrative modules, or a portion thereof, may be implemented by the processor 450.

The exemplary television system 400 may comprise one or more memories 460. As discussed above, various aspects may be performed by one or more processors executing instructions. Such instructions may, for example, be stored in the one or more memories 460. Such memory 460 may, for example, comprise characteristics of any of a variety of types of memory. For example and without limitation, such memory 460 may comprise one or more memory chips (e.g., ROM, RAM, EPROM, EEPROM, flash memory, one-time-programmable OTP memory, etc.), hard drive memory, CD memory, DVD memory, etc.

The exemplary television system 400 may comprise one or more modules (not explicitly illustrated in FIG. 4) that operate to present a television program at a normal presentation speed. Such one or more modules may, for example, operate to utilize one or more of the user interface module(s) 440 to present the television program on the display 470 (which may be in the same television component as the one or more modules or in a different television system component). The one or more modules may, for example, operate to perform step 220 of the exemplary method 200 discussed previously and/or the exemplary step 320 of the exemplary method 300 discussed previously.

The exemplary television system 400 may comprise one or more user object-selecting determination modules 454 that operate to determine that a user desires to select a user-selectable object in a television program. For example, such module(s) 454 may operate to perform step 230 of the exemplary method 200 discussed previously and/or step 330 of the exemplary method 300 discussed previously.

The exemplary television system 400 may also, for example, comprise one or more program presentation speed control module(s) 456 that operate to control presentation speed of one or more television programs to a user (e.g., on one or more displays of the television system 400). For example, such module(s) 456 may operate to perform the presentation speed control aspects of steps 220 and 240 of the exemplary method 200 discussed previously and/or steps 320 and 340 of the exemplary method 300 discussed previously.

For example, the program presentation speed control module(s) 456 may operate in conjunction with one or more television program output modules of the television system 400 to present a television program at a normal presentation speed. Also for example, the program presentation speed control module(s) 456 may operate in conjunction with one or more television program output modules of the television system 400 to present a television program at a non-normal presentation speed (e.g., at a paused or frozen state, at a slow-than-normal presentation speed, etc.).

The exemplary television system 400 may additionally comprise one or more user interaction modules 458 that operate to (e.g., in response to determining that a user desires to select a user-selectable object in a television program) interact with the user regarding user-selectable objects in the television program being presented at the non-normal presentation speed. Such user interaction may, for example, be performed operating in conjunction with the user interface module(s) 440.

For example, the user interaction module(s) 458 may, for example, operate to identify an on-screen location selected by the user (e.g., pointed to by the user with a touch, pointed to by the user with a pointing device, etc.). The user interaction module(s) 458 may also, for example, operate to determine a user-selectable object in the television program that is selected by the user. The user interaction module(s) 458 may additionally, for example, operate to output information to the user regarding the user-selected television program object. For example, such module(s) 458 may operate to perform step 250 of the exemplary method 200 discussed previously and/or steps 350 of the exemplary method 300 discussed previously.

Though not illustrated, the exemplary television 400 may, for example, comprise one or more modules that operate to perform any or all of the continued processing discussed previously with regard to step 295 of the exemplary method 200 and step 395 of the exemplary method 300, discussed previously. Such modules (e.g., as with the one or more modules 454, 456 and 458) may be performed by the processor(s) 450 executing instructions stored in the memory 460.

Figure 5:
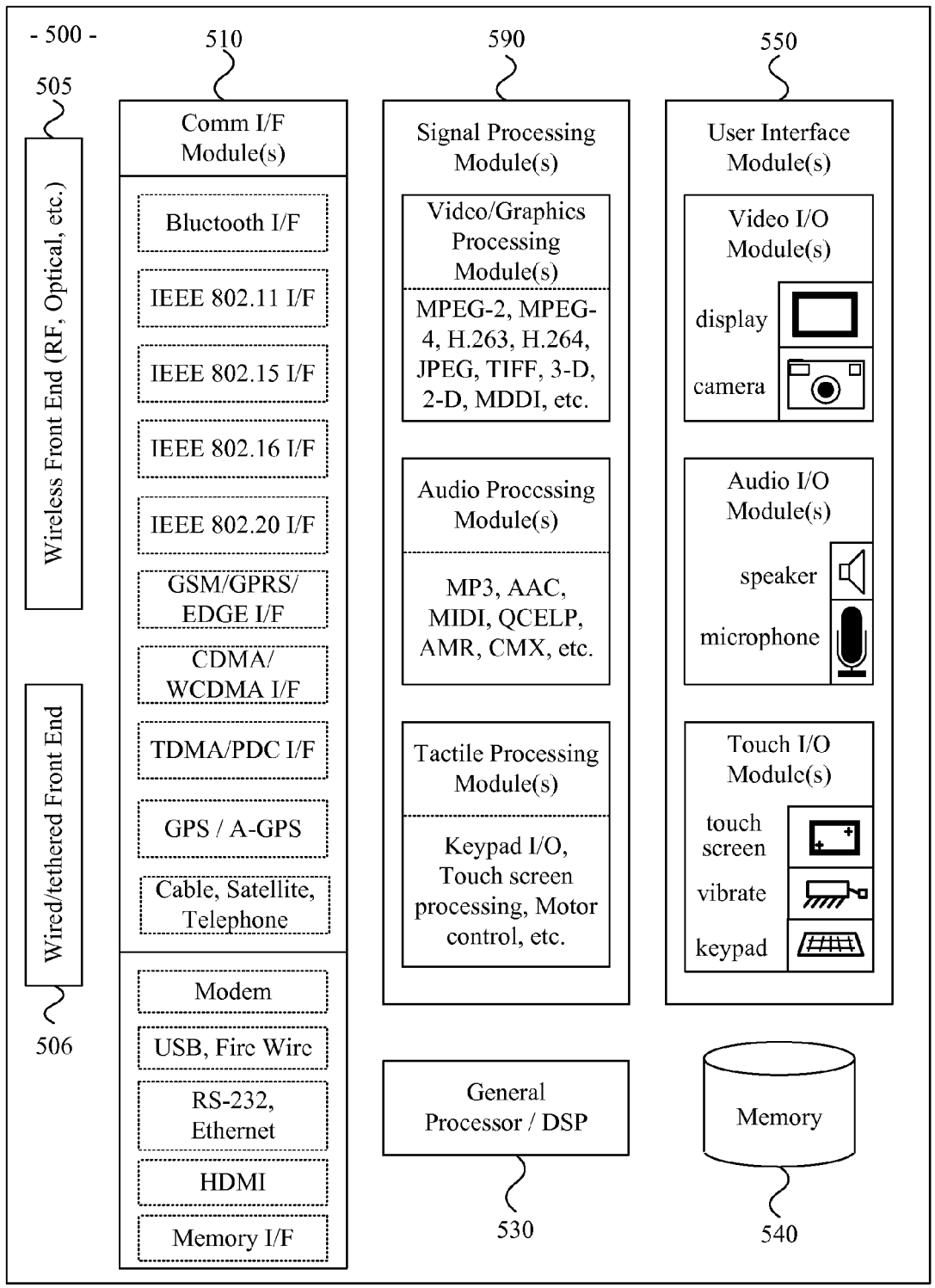
FIG. 5 is a diagram illustrating exemplary modules and/or sub-modules for a television system, in accordance with various aspects of the present invention.

Turning next to FIG. 5, such figure is a diagram illustrating exemplary modules and/or sub-modules for a television system 500, in accordance with various aspects of the present invention. The exemplary television system 500 may share any or all aspects with any of the television system 400 discussed herein and illustrated in FIG. 4. The exemplary television system 500 may, for example, share any or all characteristics with one or more of the exemplary televisions 140 and 141, television controllers 160 and 161, television receiver 151, television provider 110 and/or third party program information provider illustrated in FIG. 1 and discussed previously. Also, the exemplary television system 500 (e.g., various modules thereof) may operate to perform any or all of the functionality discussed previously with regard to the exemplary methods 200 and 300 illustrated in FIGS. 2-3 and discussed previously. As with the exemplary television system 400, the components of the exemplary television system 500 may be disposed in a single television system component (e.g., a single television, a single television receiver, a single television controller, etc.) or dispersed in a plurality of television system components (e.g., a plurality of components of a user's local television system, a combination of components comprising one or more components of the user's local television system and one or more components remote to the user's local television system, etc.).

For example, the television 500 comprises a processor 530. Such a processor 530 may, for example, share any or all characteristics with the processor 450 discussed with regard to FIG. 4. Also for example, the television 500 comprises a memory 540. Such memory 540 may, for example, share any or all characteristics with the memory 460 discussed with regard to FIG. 4.

Also for example, the television 500 may comprise any of a variety of user interface module(s) 550. Such user interface module(s) 550 may, for example, share any or all characteristics with the user interface module(s) 440 discussed previously with regard to FIG. 4. For example and without limitation, the user interface module(s) 550 may comprise: a display device, a camera (for still or moving picture acquisition), a speaker, an earphone (e.g., wired or wireless), a microphone, a video screen (e.g., a touch screen), a vibrating mechanism, a keypad, and/or any of a variety of other user interface devices (e.g., a mouse, a trackball, a touch pad, touch screen, light pen, game controlling device, etc.).

The exemplary television 500 may also, for example, comprise any of a variety of communication modules (505, 506, and 510). Such communication module(s) may, for example, share any or all characteristics with the communication interface module(s) 410, 420 discussed previously with regard to FIG. 4. For example and without limitation, the communication interface module(s) 510 may comprise: a Bluetooth interface module; an IEEE 802.11, 802.15, 802.16 and/or 802.20 module; any of a variety of cellular telecommunication interface modules (e.g., GSM/GPRS/EDGE, CDMA/CDMA2000/1x-EV-DO, WCDMA/HSDPA/HSUPA, TDMA/PDC, WiMAX, etc.); any of a variety of position-related communication interface modules (e.g., GPS, A-GPS, etc.); any of a variety of wired/tethered communication interface modules (e.g., USB, Fire Wire, RS-232, HDMI, Ethernet, wireline and/or cable modem, etc.); any of a variety of communication interface modules related to communicating with external memory devices; etc. The exemplary television 500 is also illustrated as comprising various wired 506 and/or wireless 505 front-end modules that may, for example, be included in the communication interface modules and/or utilized thereby.

The exemplary television 500 may also comprise any of a variety of signal processing module(s) 590. Such signal processing module(s) 590 may share any or all characteristics with modules of the exemplary television 400 that perform signal processing. Such signal processing module(s) 590 may, for example, be utilized to assist in processing various types of information discussed previously (e.g., with regard to sensor processing, position determination, video processing, image processing, audio processing, general user interface information data processing, etc.). For example and without limitation, the signal processing module(s) 590 may comprise: video/graphics processing modules (e.g. MPEG-2, MPEG-4, H.263, H.264, JPEG, TIFF, 3-D, 2-D, MDDI, etc.); audio processing modules (e.g., MP3, AAC, MIDI, QCELP, AMR, CMX, etc.); and/or tactile processing modules (e.g., Keypad I/O, touch screen processing, motor control, etc.).

In summary, various aspects of the present invention provide a system and method in a television system for providing for user-selection of objects in a television program. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method comprising:
   in a television system, at least:
     determining that a user desires to select a user-selectable object in a television program being presented at a first speed; and in response to said determining:
   presenting the television program at a second speed prior to user-selection of the user-selectable object, the second speed being slower than the first speed; and
   interacting with the user regarding the user-selectable object in the television program being presented at the second speed, wherein the interaction comprises receiving the user-selection of the user-selectable object;
   wherein:
     the television program being presented at the first speed is being presented on a first screen;
     said presenting the television program at the second speed comprises presenting the television program on a second screen; and
     said interacting with the user comprises interacting with the user on the second screen.

2. A television system comprising:
   at least one module operable to, at least:
   determine that a user desires to select a user-selectable object in a television program being presented at a first speed; and
   in response to said determining:
   present the television program at a second speed prior to user-selection of the user-selectable object, the second speed being slower than the first speed; and
   interact with the user regarding user-selectable objects in the television program being presented at the second speed, wherein the interaction comprises receiving the user-selection of the user-selectable object;
   wherein: the television program being presented at the first speed is being presented on a first screen;
     the at least one module is operable to present the television program at the second speed by, at least in part, operating to present the television program on a second screen; and
     the at least one module is operable to interact with the user regarding user-selectable objects in the television program being presented at the second speed by, at least in part, operating to interact with the user on the second screen.

* * * * *